US009682488B2

(12) United States Patent
Beyerlein et al.

(10) Patent No.: US 9,682,488 B2
(45) Date of Patent: Jun. 20, 2017

(54) DOUBLE-BARREL TRIMMER FOR PLANT MATERIALS

(71) Applicant: Barry Beyerlein, Seattle, WA (US)

(72) Inventors: Barry Beyerlein, Seattle, WA (US); Zhidong Luo, Guandong Province (CN)

(73) Assignee: Barry Beyerlein, Seattle, WA (US)

( * ) Notice: Subject to any disclaimer, the term of this patent is extended or adjusted under 35 U.S.C. 154(b) by 382 days.

(21) Appl. No.: 14/155,686

(22) Filed: Jan. 15, 2014

(65) Prior Publication Data

US 2014/0196587 A1    Jul. 17, 2014

Related U.S. Application Data

(60) Provisional application No. 61/752,865, filed on Jan. 15, 2013.

(51) Int. Cl.
| B26D 1/36 | (2006.01) |
| B26D 1/40 | (2006.01) |
| A01G 3/00 | (2006.01) |

(52) U.S. Cl.
CPC ............ *B26D 1/36* (2013.01); *A01G 3/00* (2013.01); *B26D 1/40* (2013.01); *Y10T 83/474* (2015.04); *Y10T 83/4795* (2015.04)

(58) Field of Classification Search
CPC .............. B26D 1/36; B26D 1/40; A01G 3/00
USPC ....................................... 144/23; 241/74, 93
See application file for complete search history.

(56) References Cited

U.S. PATENT DOCUMENTS

| 1,672,945 | A | * | 6/1928 | Kipp, Jr. | B02C 9/02 241/274 |
| 4,116,161 | A | * | 9/1978 | Steube | C23C 14/223 118/418 |
| 4,243,181 | A | * | 1/1981 | Hench | B29B 9/06 241/142 |
| 4,422,582 | A | * | 12/1983 | Roeger | B02C 18/30 241/82.5 |
| 4,706,721 | A | * | 11/1987 | Brown | B27L 11/02 144/174 |
| 4,817,479 | A | * | 4/1989 | Perrine | B26D 1/29 83/169 |
| 5,033,341 | A | * | 7/1991 | Mussig | D06H 7/025 83/18 |
| 5,595,349 | A | * | 1/1997 | Bergstrom | B08B 3/022 241/179 |
| 5,875,979 | A | * | 3/1999 | Walters | B02C 17/007 241/299 |

(Continued)

*Primary Examiner* — Jason Daniel Prone
*Assistant Examiner* — Richard Crosby, Jr.
(74) *Attorney, Agent, or Firm* — Schwabe, Williamson & Wyatt, P.C.

(57) ABSTRACT

A trimmer comprises two counter-rotating barrels side-by-side above one cutting reel. When viewed from the front, the left barrel rotates counter-clockwise while the right barrel rotates clockwise. Plant material in the barrels accumulates on the uphill side of each barrel, relative to its rotational direction, as the plant material traverses the rotating barrels. This configuration positions the uphill sides of both barrels proximate to the one reel. The barrel perforations are rifled to assist in moving the plant material through the barrels. Screw jacks are employed to tilt the trimmer; hardware facilitates use of two such trimmers in series.

19 Claims, 20 Drawing Sheets

(56) References Cited

U.S. PATENT DOCUMENTS

| | | | | |
|---|---|---|---|---|
| 6,547,170 | B2 * | 4/2003 | Byrd | B02C 9/02 241/294 |
| 6,655,615 | B1 * | 12/2003 | Hartmann | A23N 1/02 241/71 |
| 6,659,378 | B2 * | 12/2003 | Di Anna | A01G 3/002 241/101.77 |
| 6,659,694 | B1 * | 12/2003 | Asbell | B23C 5/04 407/40 |
| 6,973,862 | B2 * | 12/2005 | Bucks | B26D 7/0658 83/13 |
| 7,297,170 | B2 * | 11/2007 | Welygan | B24D 3/002 451/28 |
| 7,708,214 | B2 * | 5/2010 | Medoff | B29B 17/0042 241/28 |
| 8,544,777 | B2 * | 10/2013 | Tsai | B29B 17/0026 241/260.1 |
| 8,979,007 | B2 * | 3/2015 | Pallmann | B02C 18/144 241/242 |
| 9,016,178 | B2 * | 4/2015 | Wadsworth | B26D 1/40 493/288 |
| 2008/0263634 | A1 * | 10/2008 | Kirkland | H04L 29/06027 726/3 |
| 2011/0048253 | A1 * | 3/2011 | Melandri | A23N 15/02 99/638 |
| 2012/0279193 | A1 * | 11/2012 | Mosman | A01G 17/00 56/233 |
| 2012/0305689 | A1 * | 12/2012 | Bach | B02C 9/02 241/93 |

* cited by examiner

DOUBLE-BARREL TRIMMER FOR PLANT MATERIALS

CROSS-REFERENCE TO RELATED APPLICATIONS

This application claims the benefit of U.S. Provisional Patent Application, Ser. No. 61/752,865, filed Jan. 15, 2013, which application is incorporated herein for all purposes by this reference.

FIELD

This disclosure relates to trimmers for plant materials.

BACKGROUND

Single-barrel mechanized trimmers exist and are widely used to trim stems and leaves from harvested plant material, such as, for example, hops, rosemary, oregano, basil, mint, lavender, coriander, parsley, mixed flowers, and other plant materials which may be used in the preparation of essential oils.

Many plants are commonly harvested in one season of the year, resulting in a large quantity of plant material which must be processed in a relatively short period of time. This creates pressure to utilize trimmers intensively. To increase processing capacity, some plant processors acquire additional trimmers, though the processors must carefully weigh the capital, repair, and storage costs presented by multiple trimmers and must provide additional staff to operate and maintain the additional equipment.

To increase the speed at which plant material can be processed by mechanized trimmers, multiple trimmers are sometimes operated in sequence, with the output stream from a first trimmer being fed into the inlet of the barrel of a second trimmer. This allows the plant material to be fed through the serially connected trimmer barrels at a faster rate while achieving a similar trimmed condition in the final output stream.

Gravity is often used to facilitate movement of the plant material through the barrel. The speed of the plant material through the trimmer may be varied by tilting the front end of the trimmer—the end of the trimmer with a hopper or funnel into which plant material is fed—higher than the back end of the trimmer—the end out of which the output stream flows. Tilting the trimmer is presently only achieved by using blocks or ramps to prop the front end up higher than the back end or by rotating the entire trimmer on a mechanism within the trimmer's frame (which may be difficult to do when the trimmers are positioned in sequence). This is awkward, time consuming, and may result in compromises between improving the trimmed condition of the plant material versus putting more time into adjusting the blocks or ramps used to tilt the trimmer.

DETAILED DESCRIPTION

Figure 1:
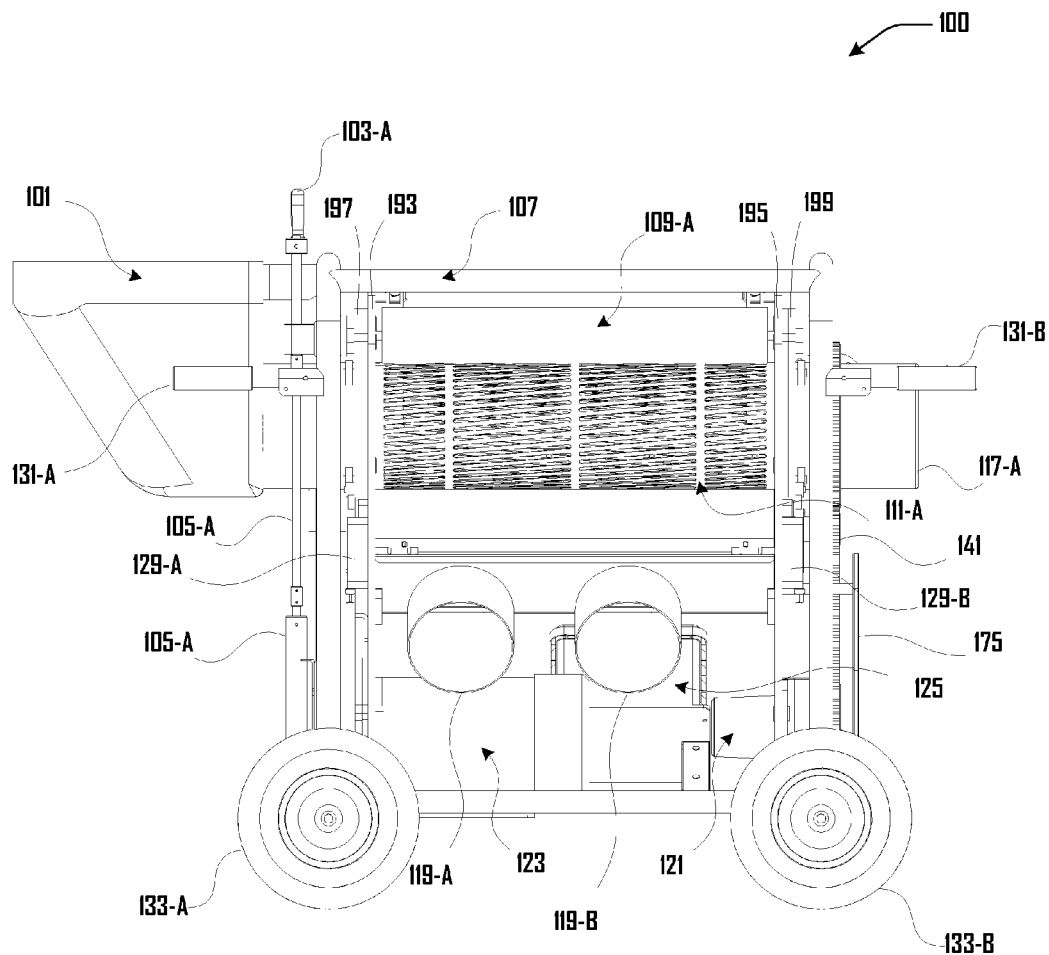
FIG. 1 is a right elevation view of an embodiment.

The description of the drawings and the following detailed description refer to the accompanying drawings. The same element number in different drawing figures generally identifies the same or similar elements and/or components. In the drawings, pointers go from the element numbers to the illustration of elements in the drawings; these pointers may touch or point to any part of the illustrated element (the area immediately beneath the pointer may not be the only component associated with the element number). In the element numbers, the first or second number (in the case of four digit element numbers) refers to the first Figure in which the element is numbered. Element numbers followed by a "-A" or "-B" identify substantially similar components (including components which are mirror images of one another), within conventional manufacturing tolerances; when written without the "-A" or "-B," the element number shall refer to either such component. Electrical power cords are not illustrated in the drawings for the sake of visual simplicity.

This Detailed Description section provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

As used herein, "releasable," "connect," "connected," "connectable," "disconnect," "disconnected," and "disconnectable" refers to two or more structures which may be connected or disconnected, generally without the use of tools (examples of tools including screwdrivers, pliers, drills, saws, welding machines, torches, irons, and other heat sources) and generally in a repeatable manner. As used herein, "attach," "attached," or "attachable" refers to two or more structures or components which are attached through the use of tools or chemical or physical bonding. As used herein, "secure," "secured," or "securable" refers to two or more structures or components which are either connected or attached.

Figure 5A:
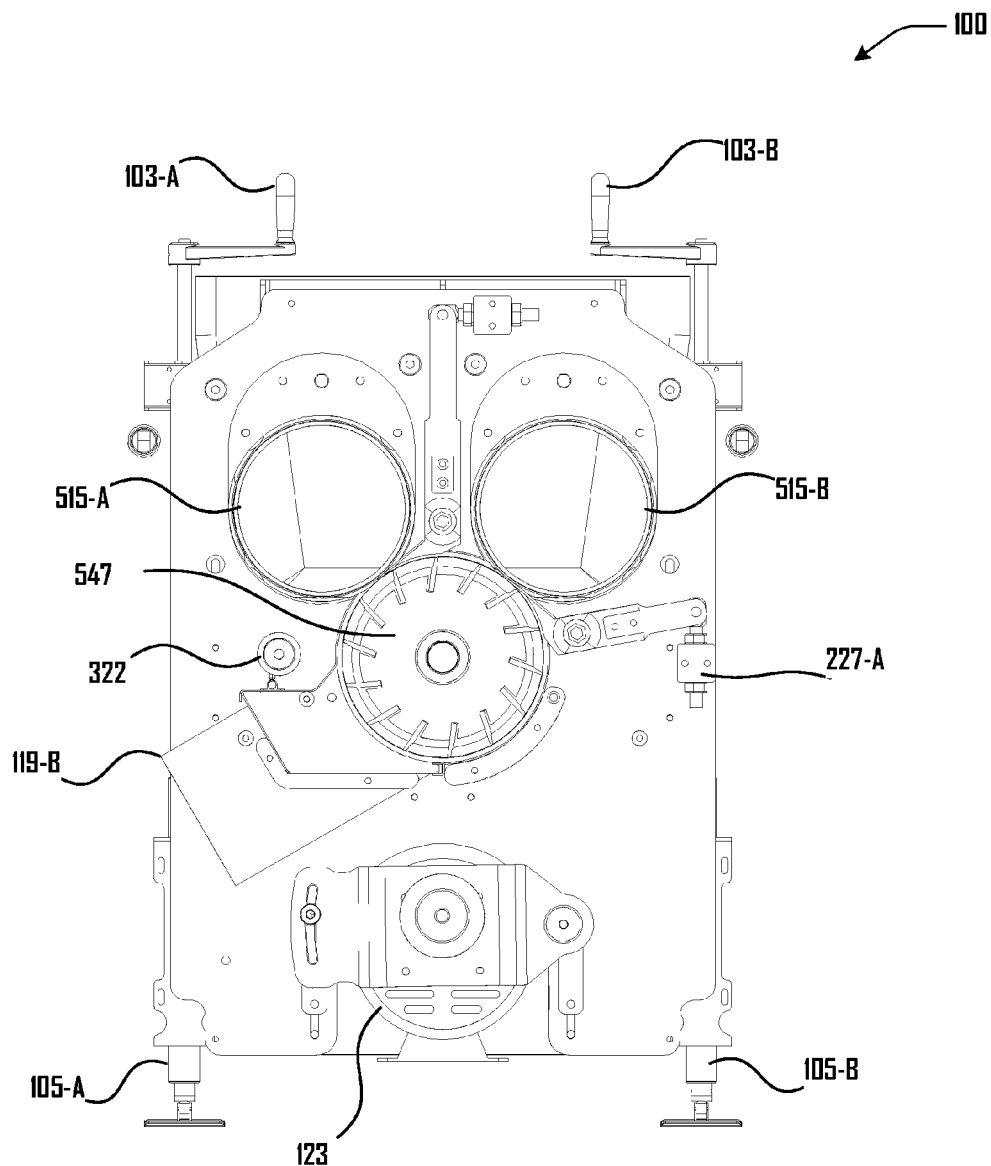
FIG. 5A is a back elevation view of an embodiment with components hidden.

Referring to all of the Figures, the disclosed Trimmer 100 comprises a Cart Frame 107 secured to other components. A Hopper 101 receives plant material (not shown) and channels the plant material toward two Barrel Inlets 515-A and 515-B (FIG. 5A illustrates the Barrel Inlets 515 in elevation; please see FIG. 5B and FIG. 7 for an isometric view of Barrel Inlets 515). The end of the Trimmer 100 with the Hopper 101 is referred to herein as the "front" of the Trimmer 100. References herein to "right" and "left" sides of the Trimmer 100 are relative to a viewer looking at the front of the trimmer, down its long axis.

Barrel Inlets 515 and Barrel Outlets 117-A and 117-B are separately secured to or abut a Left Barrel 111-B and a Right Barrel 111-A (referred to collectively as "Barrels 111"). The Left Barrel 111-B and Right Barrel 111-A are perforated. The perforations form a rifled helical pattern, with the perforation rifling mirrored, one Barrel 111 relative to the other. The Barrel 111 rifling encourages movement of the plant material down the Barrels 111 when the Barrels 111 rotate. Barrel perforations in previous plant trimmers are not known to be rifled. The Barrel 111 perforation rifling is mirrored because the Barrels 111 counter-rotate, which requires that the rifling be mirrored in order to encourage movement of the plant material down the Barrels 111 when the Barrels 111 rotate.

The Barrels 111 are driven by a Barrel Motor 121, attached to the Barrels 111 by a Barrel Power Train 1479 (discussed further herein). When viewed looking at the front, the Right Barrel 111-A rotates clockwise while the Left Barrel 111-B rotates counter-clockwise. Because the Barrels 111 counter-rotate, plant material fed into the Barrels 111 accumulates on the side of each Barrel 111 toward the center of the Trimmer 100.

The Trimmer 100 further comprises a single rotating cutting Reel 547, a Right Barrel Blade 549-A, and a Left Barrel Blade 549-B ("Barrel Blades 549"). The Reel 547 comprises a set of helical reel blades radially arranged around a Reel Axle 646.

The Barrel Blades 549 are positioned generally on the underside of and between the Barrels 111, oriented along the same long horizontal axis. The Right Blade Edge 657-A and the Left Blade Edge 657-B ("Blade Edges 657") contact, graze, or become proximate to the Reel 547 forming what are hereinafter referred to as "Cut Locations." As illustrated by elements 676-A and 676-B in FIG. 6B (identified with dotted lines), the Blade Edges 657 and Cut Locations are approximately equidistant from the center of the Reel Axle 646.

When plant material is fed into the Barrels 111, stems, leaves, and other projections from the plant material project through the perforations in the Barrels 111 and enter the Cut Locations. The projecting plant material is trimmed in the Cut Locations by the contact or proximity of the rotating Reel 547 and the Blade Edges 657 and/or by the contact or proximity of the rotating Reel 547 and the perforated Barrels 111. The Barrel Blades 549 may be omitted, operating the Trimmer 100 solely with the Reel 547 and the Barrels 111. The Barrel Blades 549 may also or alternatively serve to clean resin and other residue off of the Reel 547.

Because the Barrels 111 are rotating, the plant material tumbles as it transits the Barrels 111, creating opportunity for the projecting plant material to be adequately trimmed if it spends enough time in the Barrels.

The Trimmer 100 outputs two streams: A "Primary Stream" issues from the back of the Trimmer 100, through the Barrel Outlets 117. The Primary Stream comprises relatively compact clusters of material, such as flower buds or cones. A "Secondary Stream" issues from Waste Outlets 119-A and 119-B, comprising trimmed waste material, such as stems and leaves. While referred to herein as "waste," the Secondary Stream may, in fact, be utilized while the Primary Stream may not be utilized; the characteristics and uses of the two streams may depend upon the plant material being processed and the outcome desired by the processor. A vacuum (not shown) may be attached to the Waste Outlets 119 to facilitate removal of the Secondary Stream from the Trimmer 100. The correct vacuum force will keep the plant material in locations within the Barrels 111 and/or for a span of time within the Barrels 111, which locations and/or span of time facilitate trimming and improve trimming efficiency.

The Barrel Power Train 1479 transfers power from the Barrel Motor 121 to the Barrels 111 and causes the Barrels 111 to counter-rotate. The drawings illustrate an embodiment in which the Barrel Power Train 1479 comprises a Barrel Motor 121, a Barrel Motor Gear Box 1267, a Barrel Belt 141, Roller 322, a Right Drive Train Ring 316-A and a Left Drive Train Ring 316-B ("Drive Train Rings 316") separately secured to each Barrel 111, which Drive Train Rings 316 engage with the Barrel Belt 141. Rollers, such as Roller 322, guide the Barrel Belt 141 to contact the Right Barrel 111-A. The interior perimeter of the Barrel Belt 141 engages with the Left Drive Train Ring 316-B while the exterior perimeter of the Barrel Belt 141 engages with the Right Drive Train Ring 316-A. The result is that the Left Barrel 111-B rotates in the same direction as the Barrel Motor 121, while the Right Barrel 111-A rotates in the opposite direction. When viewed from the front, such as in FIG. 9, the Right Barrel 111-A rotates clockwise, indicated by element 912, while the Left Barrel 111-B rotates counter-clockwise, indicated by element 914. Plant material traversing the Barrels 111 then has a tendency to accumulate in the lower right-hand quadrant of the Left Barrel 111-B and to accumulate in the lower left-hand quadrant of the Right Barrel 111-A, generally above the center of the Reel 547.

The Barrel Power Train 1479 may be provided by a number of embodiments, such as a by one or more motors connected to the Barrels by a shaft and gears, by a belt, a chain, by hydraulic lines and couplings, or by other power transmission means. The Barrel Power Train 1479 may provide power directly to a first Barrel, while the second Barrel obtains power from the first Barrel, such as via a gear, chain, belt, and the like.

Figure 5B:
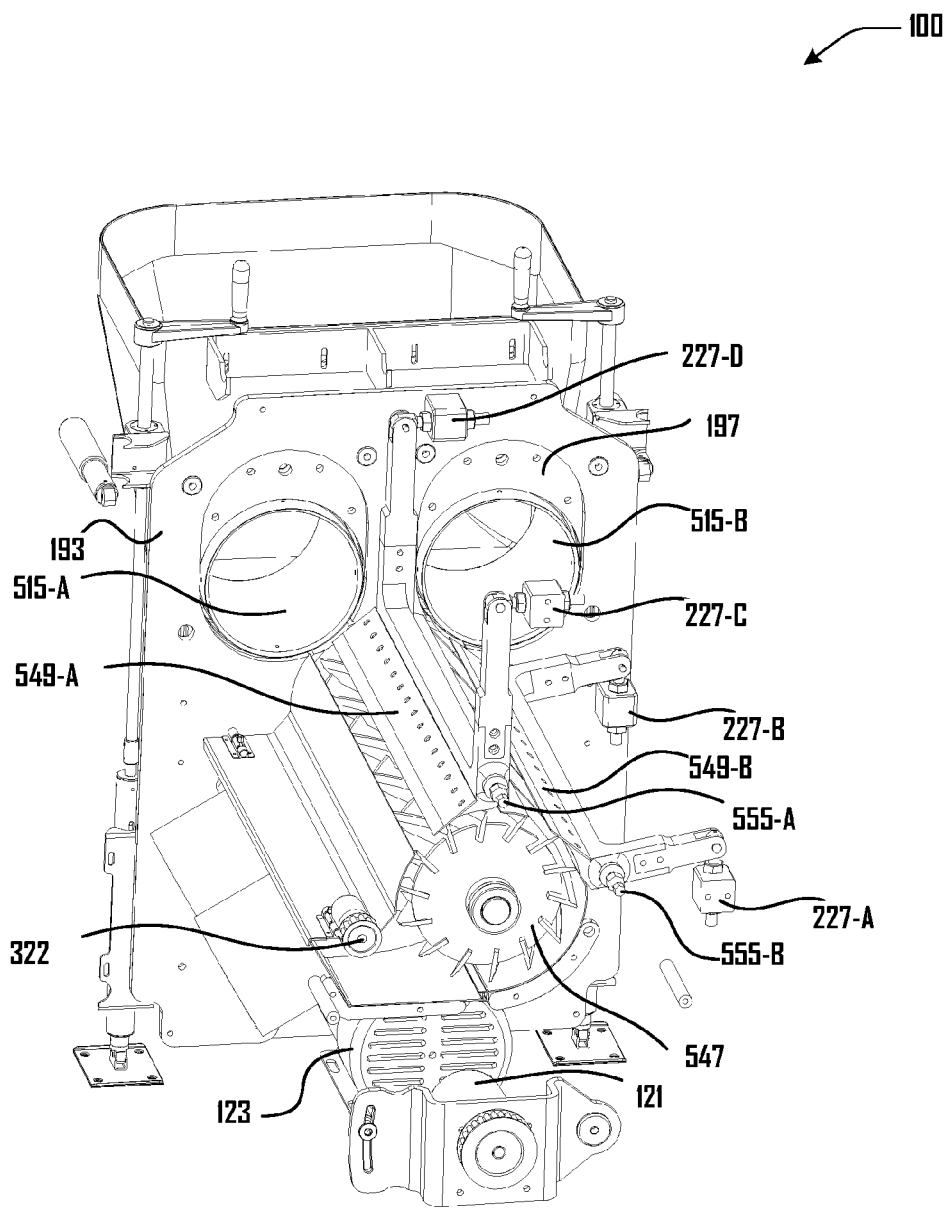
FIG. 5B is an isometric back-right-top view of an embodiment with the same components hidden as in FIG. 5A.
Figure 6A:
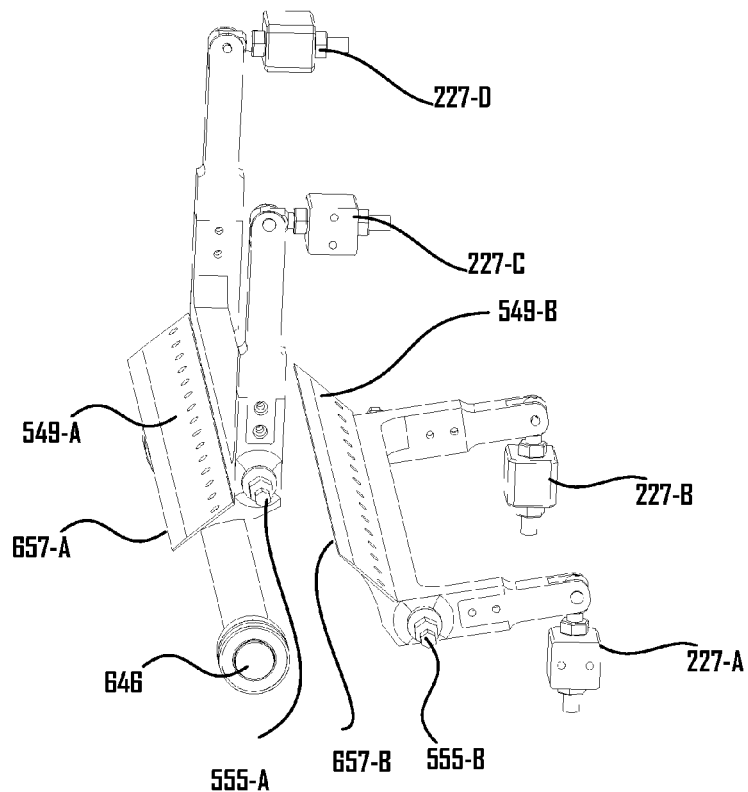
FIG. 6A is a back-left-top isometric view of an embodiment of the blades and the reel axle.
Figure 6B:
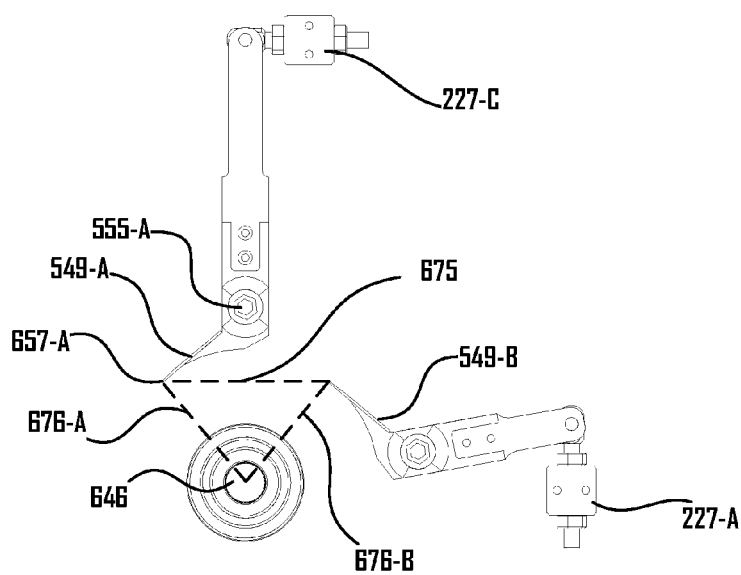
FIG. 6B is a back elevation view of an embodiment of the blades and the reel axle.

FIGS. 5A, 5B, 6A and 6B illustrate an embodiment from the rear, with components hidden to illustrate the position of the Barrel Blades 549 relative to the Reel 547 (FIGS. 6A and 6B illustrate the Reel Axle 646, but not the Reel 547). As illustrated in FIG. 6B, the Blade Edges 657 may be on a common Horizontal Plane 675. Plant material is trimmed in the area where the plant material accumulates within each Barrel 111 as a result of counter-rotation of the Barrels.

By having the Barrels 111 counter-rotate, only one Reel 547 is required and both Barrels 111 may share a common waste catchment area for the Secondary Stream, comprising the Waste Outlets 119 and any bag, basin, other catchment structure connected thereto.

The Reel 547 is powered by the Reel Motor 123, which is connected to the Reel 547 by a Reel Power Train 1481. In the illustrated embodiment, the Reel Power Train 1481 comprises a Reel Belt 963 which transfers power from the Reel Motor 123 to the Reel 547. As with the Barrel Power Train 1479, a number of embodiments may be utilized, such as one or more motors connected to the Reel by a shaft and gears, by a belt, a chain, by hydraulic transmission lines or by other power transmission means.

The Barrel Blades 549 can rotate around Blade Adjustment Axles 555-A and 555-B, through use of Blade Adjustment Assemblies 227-A through 227-D. The Blade Adjustment Assemblies 227 comprise an expandable coupling which may be used to adjust the space between the Barrel Blades 549 and the Reel 547.

The height of each Barrel 111 above the Reel 547 may be adjusted by Barrel-Reel Space Adjustors 129-A, 129-B, 129-C, and 129-D. The Barrel-Reel Space Adjustors 129-A and 129-C connect the Forward Mounting Plate 193 to the Forward Barrel Mounting Plate or Plates 197 while Barrel-Reel Space Adjustors 129-B and 129-D connect the Rear Mounting Plate 195 to the Rear Barrel Mounting Plate or Plates 199. The Barrel-Reel Space Adjustors 129 define the relative vertical position of the Forward Mounting Plate 193 and the Forward Barrel Mounting Plate 197 and the Rear Mounting Plate 195 and the Rear Barrel Mounting Plate 199, allowing the relative vertical position of the Barrels 111 and Reel 547 to be adjusted.

Because one Reel 547 is used to trim plant material projecting from both Barrels 111 (which one Reel 547, in the illustrated embodiment, rotates in a counter-clockwise direction), both of the Barrels 111 must be positioned proximate to the Reel 547. To achieve assistance from gravity in pushing the projections in the plant material through the perforations in the Barrels 111, the Barrels 111 are preferentially positioned vertically above the Reel 547. Smaller Barrels may be used to allow the Barrels to be positioned more vertically above the Reel 547; smaller Barrels, however, can transport less plant material and provide fewer perforations for projections from the plant material (which projections are trimmed by the Reel 547). In addition, because the leading edge of each Barrel Blade 549 may preferentially intersect with plant material projecting out of the Barrel 111 perforations without interfering with the other Barrel 111, one of the Barrel Blades must be positioned between the Barrels (in the illustrated embodiment, the Right-Barrel Blade 549-A must be positioned between the Barrels). As a consequence, space, such as Barrel-Barrel Space 961 (indicated by a dashed line at this element number), must be provided between the Barrels 111 for a Blade and a Blade Adjustment Assembly. If the Barrels are too small and positioned too vertically above the Reel 547, inadequate space will be provided between the Barrels 111 for a Blade and Blade Adjustment Assembly. If the Barrels are too large for a given Reel 547, the Cut Locations will begin to move upward relative to the Barrels (toward the horizontal center line of the Barrels, along the perimeter), which would move the Cut Locations out of the area where the maximum amount of plant material projects through the Barrel 111 perforations. Balancing this set of competing criteria is complex. In the illustrated example, a balance between these factors is achieved when the diameter of the Reel 547 is approximately 8" and the diameter of the Barrels is approximately 6.6"; in existing trimmers, the reel has a diameter on the order of 4" while the single barrel has a diameter on the order of 5".

The drawings also illustrate an Electronics Box 125 containing circuits which allow the Barrel Motor 121 and the Reel Motor 123 to be turned on and off separately from one another (such as via Barrel Motor On/Off Control 271 and Reel Motor On/Off Control 273) and which allow the speed of the Barrel Motor 121 to be controlled (such as via Barrel Speed Control 269). Existing trimmers are not known to allow the rotating speed of the barrel to be controlled.

The drawings also illustrate Brushes 109-A and 109-B, which Brushes 109 contact the Barrels 111 and push some of the plant material back into the Barrels 111. The Brushes 109 generally comprise bristles and Brush Bearing Assemblies 345, which Brush Bearing Assemblies 345 allow the Brushes 109 to rotate with power provided by the contact of the Barrels 111 with the Brushes 109. The Brush Bearing Assemblies 345 may include rollers (not shown) which would contact the Barrels 111 and which would then drive the Brushes 109 at a speed different than the speed obtained by being driven by direct contact between the Brushes 109 and the Barrels 111.

The drawings also illustrate a Barrel Retainer 343. The Barrel Retainer 343 comprises two rollers, each of which contacts the Drive Train Rings 316 on the two Barrels 111 and/or Waste Outlet 119; the Barrel Retainer 343 opposes horizontal motion of the Barrels. A Barrel Retainer or the like may also be provided on the front.

The drawings also illustrate Screw Jacks 105-A and 105-B, operated by Jack Cranks 103-A and 103-B, and connected to Jack Feet 306-A and 306-B. The Screw Jacks 105 may be used to change the elevation of the front of the Trimmer 100, without the use of ramps found in existing trimmers. The Screw Jacks 105 may also secure the disclosed Trimmer 100 in a location. By changing the elevation of the front of the Trimmer 100, the Screw Jacks 105 allow the pitch of the Trimmer 100 to be changed. The pitch of the Trimmer 100 is another factor which influences the rate at which plant material traverses the Barrels 111.

The drawings also illustrate Barrel Bearings 965-A through 965-H, which support the Barrels 111 and allow the Barrels 111 to rotate.

The drawings also illustrate Cart Handles 131 and Cart Wheels 133, which may be used to move the Trimmer 100. The Cart Handles 131 comprise a pivot, which pivot allows the Cart Handles 131 to fold.

Figure 15A:
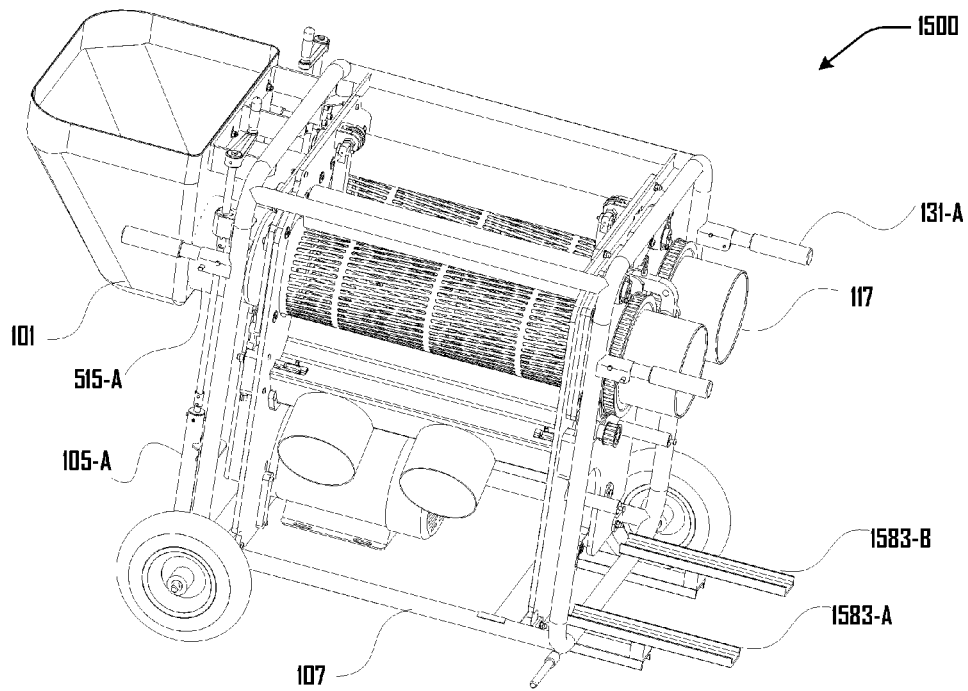
FIG. 15A is a back-right-top isometric view of an embodiment of a trimmer-trimmer support.
Figure 15B:
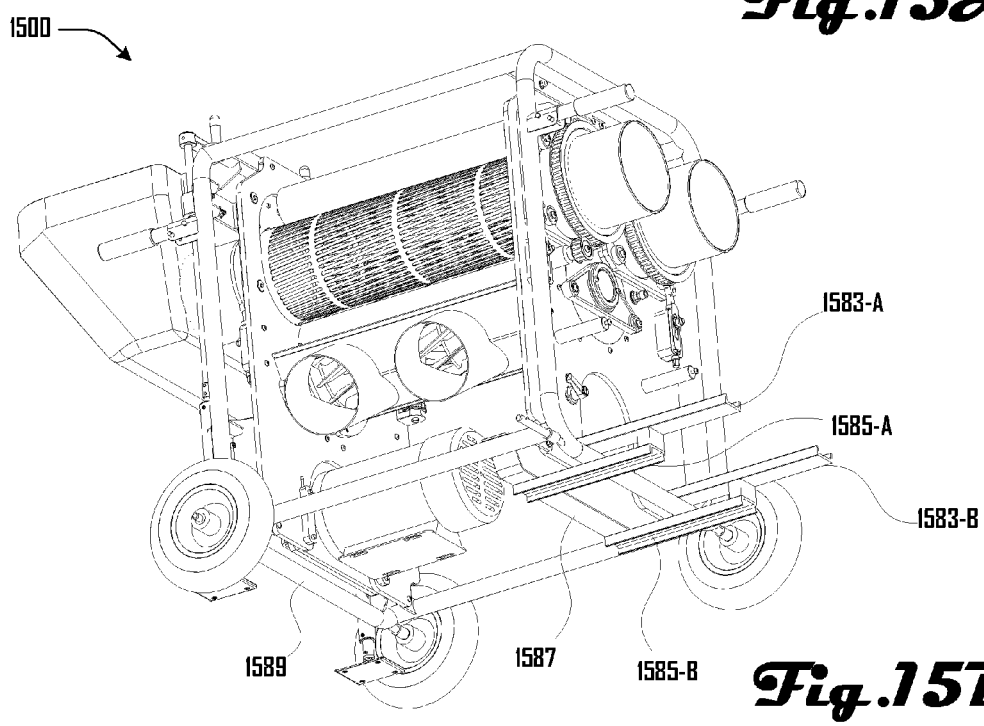
FIG. 15B is a back-right-bottom isometric view of the trimmer-trimmer support illustrated in FIG. 15A.

FIGS. 15A and 15B illustrate a Trimmer 1500 embodiment, with certain components hidden and showing an embodiment of a Rear Mounted Trimmer-Trimmer Support 1583-A and 1583-B. The Rear Mounted Trimmer-Trimmer Supports 1583 may be utilized to connect or attach two of the trimmers in series and to then tilt the trimmers via the Screw Jacks 105. To utilize the Rear Mounted Trimmer-Trimmer Supports 1583, two of the Trimmers 1500 are positioned proximate to each other, one the "Uphill" Trimmer 1500 and the other the "Downhill" Trimmer 1500. In this discussion, the Uphill Trimmer 1500 and Downhill Trimmer 1500 are assigned relative to the configured tilt. The Hopper 101 of the Downhill Trimmer 1500 is removed and the Barrel Outlet 117 of the Uphill Trimmer 1500 is positioned to abut the Barrel Inlet 515 of the Downhill Trimmer 1500. The Cart Handles 131 on the abutting side of both Trimmers 1500 may be folded down.

The Rear Mounted Trimmer-Trimmer Supports 1583 on the Uphill Trimmer 1500 contact the top of the forward bottom tube of the Downhill Trimmer 1500 Cart Frame 107, next to the Screw Jacks 105 on the downhill Cart Frame 107. The forward bottom tube of a Downhill Trimmer 1500 Cart Frame 107 is identified at element 1589. The Screw Jacks 105 on the Uphill Trimmer 1500 are extended to contact the ground and raise the Uphill Trimmer 1500 to an angle. Because the Rear Mounted Trimmer-Trimmer Supports 1583 of the Uphill Trimmer 1500 are on the top of the Downhill Trimmer 1500 Cart Frame 107, when raised by the Screw Jacks 105, the Uphill Trimmer 1500 pivots about the contact points between the Uphill Trimmer's 1500 Rear Mounted Trimmer-Trimmer Supports 1583 and the downhill trimmer's Cart Frame 107. The Screw Jacks 105 on the Downhill Trimmer 1500 are also extended to contact the ground and to raise the Downhill Trimmer 1500 to an angle. Because the back of the Uphill Trimmer 1500 is supported on the forward bottom tube of the Downhill Trimmer 1500, when the Screw Jacks 105 on the Downhill Trimmer 1500 are extended, the back of the Uphill Trimmer 1500 is also raised (the end of the Uphill Trimmer 1500 comprising the Barrel Outlets 117). By adjusting the Screw Jacks 105 on both trimmers, a continuous tilt from the uphill trimmer to the downhill trimmer is achieved.

The Rear Mounted Trimmer-Trimmer Supports 1583 are secured to Rear Mounted Trimmer-Trimmer Support Brackets 1585 and to a Rear Mounted Trimmer-Trimmer Support Bar 1587. The Rear Mounted Trimmer-Trimmer Supports 1583, Rear Mounted Trimmer-Trimmer Support Brackets 1585, and Rear Mounted Trimmer-Trimmer Support Bar 1587 may be bolted, welded, brazed, or otherwise connected or attached to the Cart Frame 107.

Figure 16A:
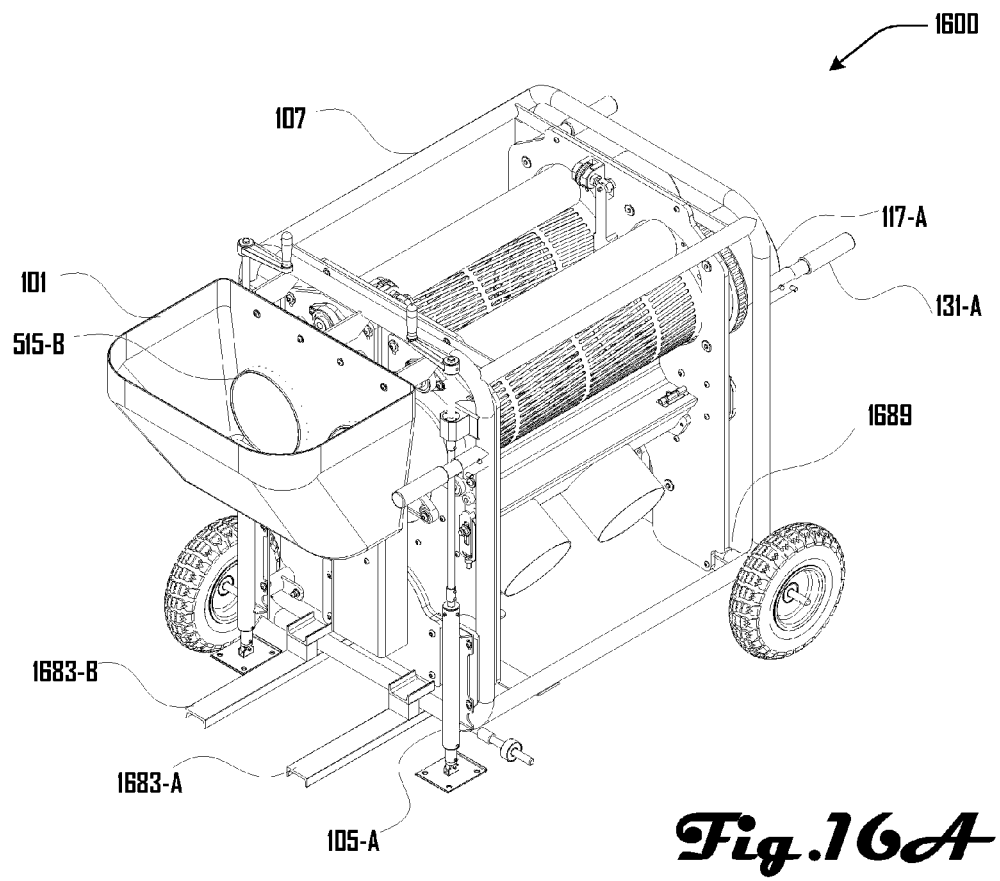
FIG. 16A is a front-right-top isometric view of an embodiment of a trimmer-trimmer support.
Figure 16B:
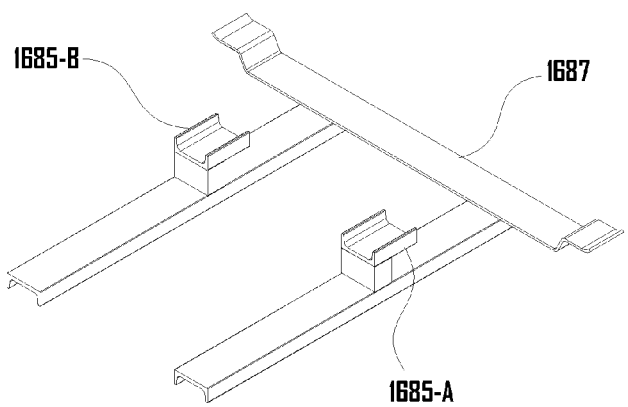
FIG. 16B is a detailed front-right-top isometric view of the trimmer-trimmer support illustrated in FIG. 16A.

FIGS. 16A and 16B illustrate a Trimmer 1600 embodiment, with certain components hidden and showing an embodiment of a Front Mounted Trimmer-Trimmer Support 1683-A and 1683-B. As with the Rear Mounted Trimmer-Trimmer Supports 1583, the Front Mounted Trimmer-Trimmer Supports 1683 may be utilized to connect or attach two of the trimmers in series and to then tilt the trimmers via the Screw Jacks 105. To utilize the Front Mounted Trimmer-Trimmer Supports 1683, two of the Trimmers 1600 are positioned proximate to each other, one the "Uphill" Trimmer 1600 and the other the "Downhill" Trimmer 1600. In this discussion, the Uphill Trimmer 1600 and Downhill Trimmer 1600 are assigned relative to the configured tilt. The Hopper 101 of the Downhill Trimmer 1600 is removed and the Barrel Outlet 117 of the Uphill Trimmer 1600 is positioned to abut the Barrel Inlet 515 of the Downhill Trimmer 1500. The Cart Handles 131 on the abutting side of both Trimmers 1500 may be folded down.

The Front Mounted Trimmer-Trimmer Supports 1683 on the Downhill Trimmer 1600 contact the bottom of the rear bottom tube of the Downhill Trimmer 1600 Cart Frame 107, next to the Screw Jacks 105 on the downhill Cart Frame 107. The rear bottom tube of a Downhill Trimmer 1600 Cart Frame 107 is generally identified at element 1689. The Screw Jacks 105 on the Downhill Trimmer 1600 are extended to contact the ground and raise the Downhill Trimmer 1600 to an angle. Because the Front Mounted Trimmer-Trimmer Supports 1683 of the Downhill Trimmer 1600 contact the bottom of the Downhill Trimmer 1600 Cart Frame 107, when raised by the Screw Jacks 105, the Downhill Trimmer 1600 raises the rear of the Uphill Trimmer 1600. The Screw Jacks 105 on the Uphill Trimmer 1600 are also extended to contact the ground and to raise the Uphill Trimmer 1600 to an angle. By adjusting the Screw Jacks 105 on both trimmers, a continuous tilt from the uphill trimmer to the downhill trimmer is achieved.

The Front Mounted Trimmer-Trimmer Supports 1683 are secured to Front Mounted Trimmer-Trimmer Support Brackets 1685 and to a Front Mounted Trimmer-Trimmer Support Bar 1687. The Front Mounted Trimmer-Trimmer Supports 1683, Front Mounted Trimmer-Trimmer Support Brackets 1685, and Front Mounted Trimmer-Trimmer Support Bar 1687 may be bolted, welded, brazed, or otherwise connected or attached to the Cart Frame 107.

Figure 17A:
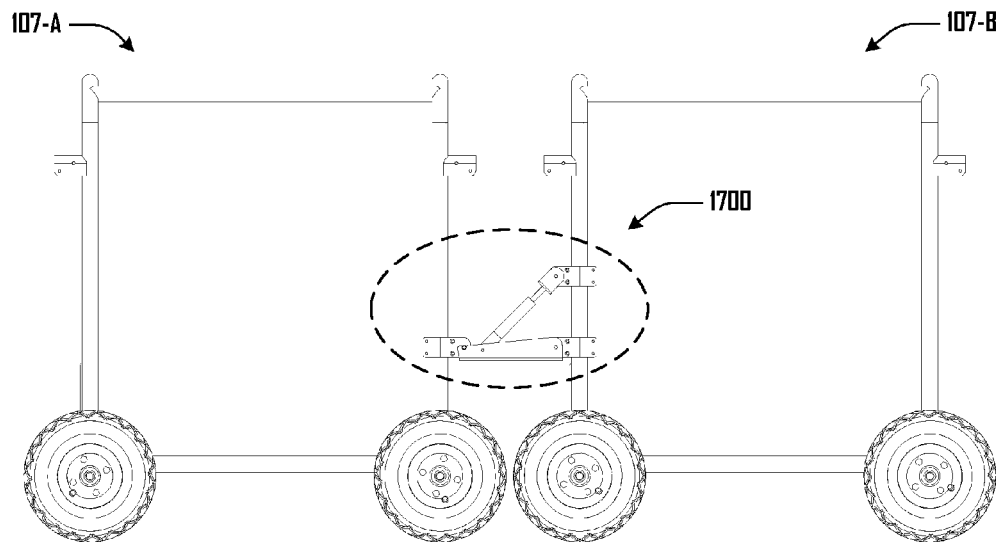
FIG. 17A is a right side elevation view of an embodiment of a trimmer-trimmer support.
Figure 17B:
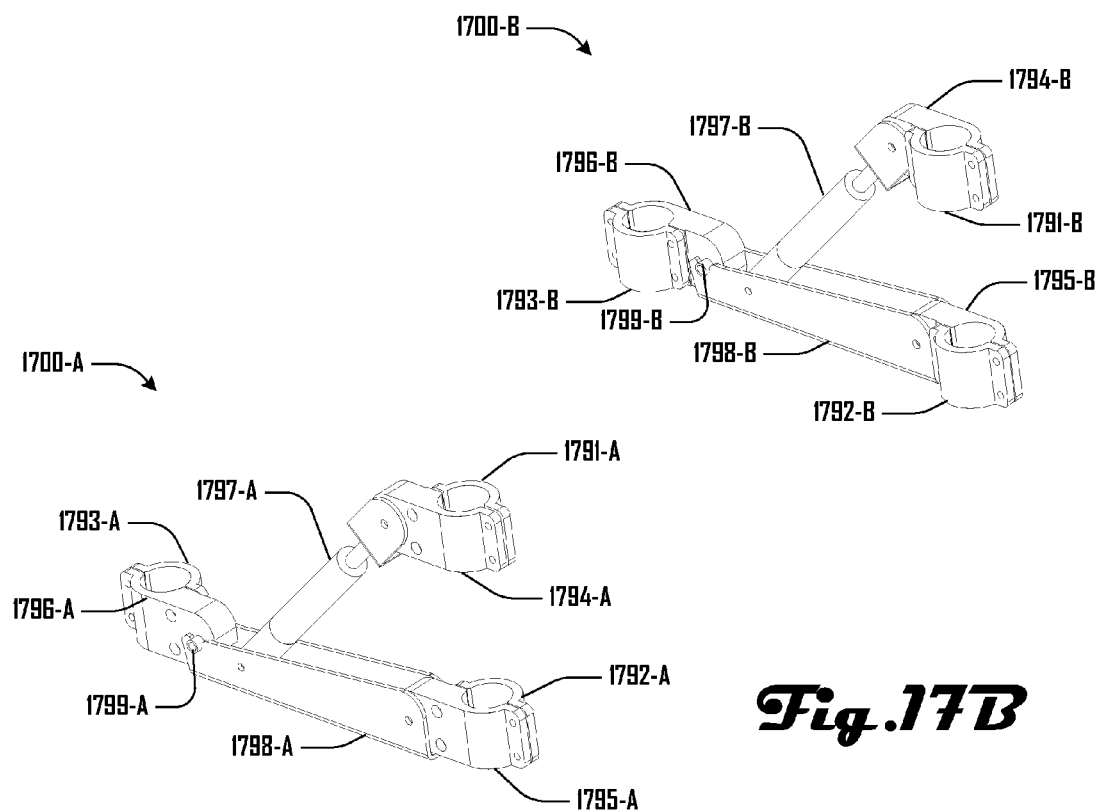
FIG. 17B is a back-right-top isometric view of the trimmer-trimmer support illustrated in FIG. 17A.

FIGS. 17A and 17B illustrate Adjustable Trimmer-Trimmer Supports 1700. The Adjustable Trimmer-Trimmer Supports 1700 attach the Cart Frame 107-A of a first Trimmer 100 to the Cart Frame 107-B of a second Trimmer 100 (for the sake of visual clarity, only the Cart Frames 107 of the Trimmers 100 are illustrated in FIG. 17A).

The Adjustable Trimmer-Trimmer Supports 1700 comprise Brackets 1791, 1792, and 1793. The Brackets 1791, 1792, and 1793 are attached to Bracket Mounts 1794, 1795, and 1796, around the Cart Frames 107, thereby attaching the Adjustable Trimmer-Trimmer Supports 1700 to the Cart Frames 107.

The lower Bracket Mounts 1795 and 1796 comprise Pin 1799, which extends out of the lower Bracket Mounts 1795 and 1796. The Pin 1799 engages with a Cut-Out 1702 (see FIG. 17C) in the Arm 1798, such that the Arm 1798 lifts the uphill Trimmer 100 from beneath the Pin 1799. The Arm 1798 is rotatably attached to Bracket Mount 1795 and Diagonal Arm 1797. The Arm 1798 may rotate, relative to Bracket Mount 1795 when the length of the Diagonal Arm 1797 is changed.

Diagonal Arm 1797 is illustrated as an adjustable hydraulic arm, wherein the length of the Diagonal Arm 1797 may be adjusted such as through regulation of a pressurized gas or liquid within the Diagonal Arm 1797. Other means of adjusting the length of the Diagonal Arm 1797 may be provided, such as a jack screw (a jack screw may also be inferred from FIGS. 17A and 17B). The Diagonal Arm 1797 may be substituted by, for example, a cable, including an adjustable length cable, or the like.

In use, Brackets 1793 and Bracket Mounts 1796 may be left attached or secured to the Cart Frame 107-A of the uphill Trimmer 100. Brackets 1792 and 1791 and Bracket Mounts 1794 and 1795 may be left attached or secured to the Cart Frame 107-B of the downhill Trimmer 100. The uphill and downhill Trimmers 100 are positioned proximate to one another (as before, the "uphill" and "downhill" Trimmers 100 are assigned relative to the configured tilt) and the Hopper 101 of the downhill Trimmer 100 is removed and the Barrel Outlet 117 of the uphill Trimmer 100 is positioned to abut the Barrel Inlet 515 of the downhill Trimmer 100. The Cart Handles 131 on the abutting side of both Trimmers 1500 may be folded down. The Arms 1798 (attached to the Bracket Mounts 1795 and 1794 on the downhill Trimmer 100) are positioned such that the Cut-Out 1702 in the Arm 1798 is below the Pin 1799. The Screw Jacks 105 on the downhill Trimmer 100 are extended, which brings the Arm 1798 and Cut Out 1702 up to contact the Pin 1799, raises up the back of the uphill Trimmer 100, and raises the front of the downhill Trimmer 100. The Screw Jacks 105 of the uphill Trimmer 100 may be extended, to raise the front of the uphill Trimmer 100. The Screw Jacks 105 of both Trimmers 100 may be adjusted to adjust the overall angle of both Trimmers 100. As noted elsewhere, the length of Diagonal Arm 1797 may be adjusted or Diagonal Arm 1797 may be replaced with an equivalent structure providing an equivalent function.

Figure 18:
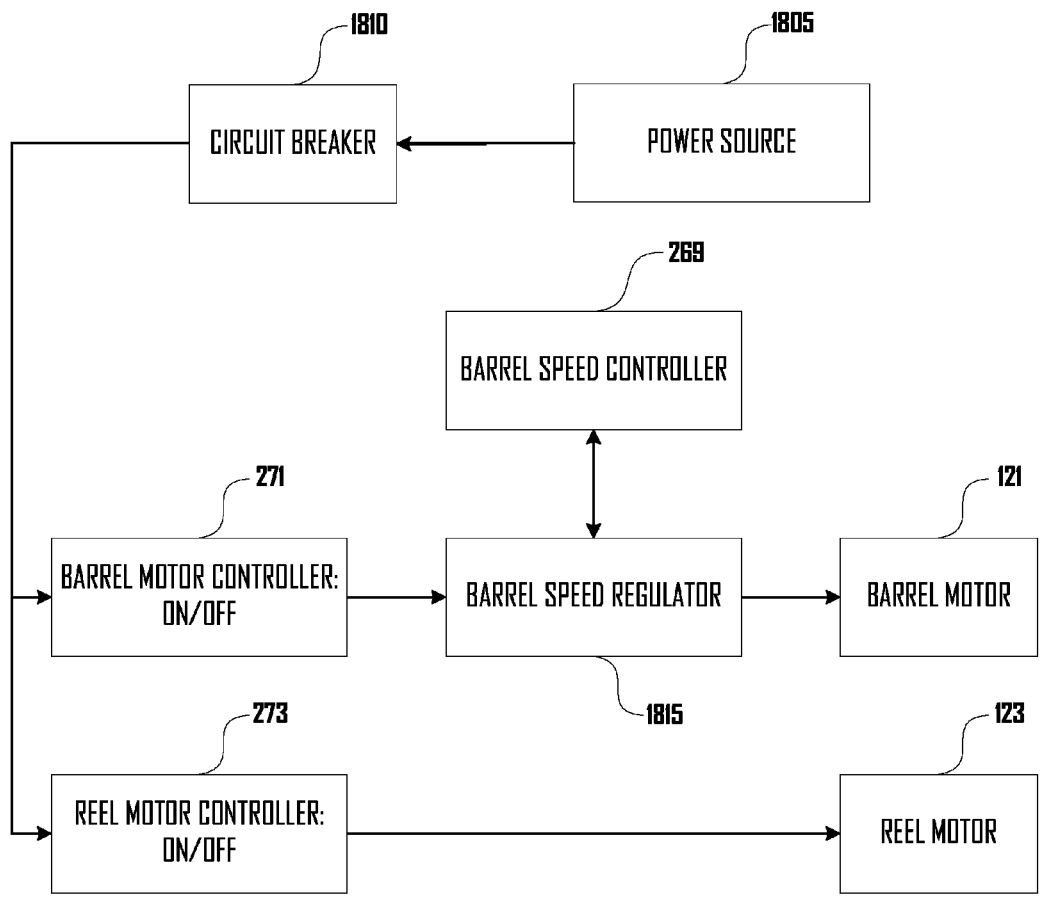
FIG. 18 is a schematic diagram of electronics in a trimmer embodiment.

FIG. 18 provides a schematic wiring diagram of electronics in an embodiment, in which electrical power from a Power Source 1805 passes through a Circuit Breaker 1810 and to the Barrel Motor Controller 271 and the Reel Motor Controller 273, both of which are illustrated as on/off switches. Power from the Barrel Motor Controller 271 then passes through a Barrel Speed Regulator 1815, which may be controlled by the Barrel Speed Controller 269, before attaching to the Barrel Motor 121. Power from the Reel Motor Controller 273 passes to the Reel Motor 123.

Following is additional information regarding certain of the Figures.

Figure 2:
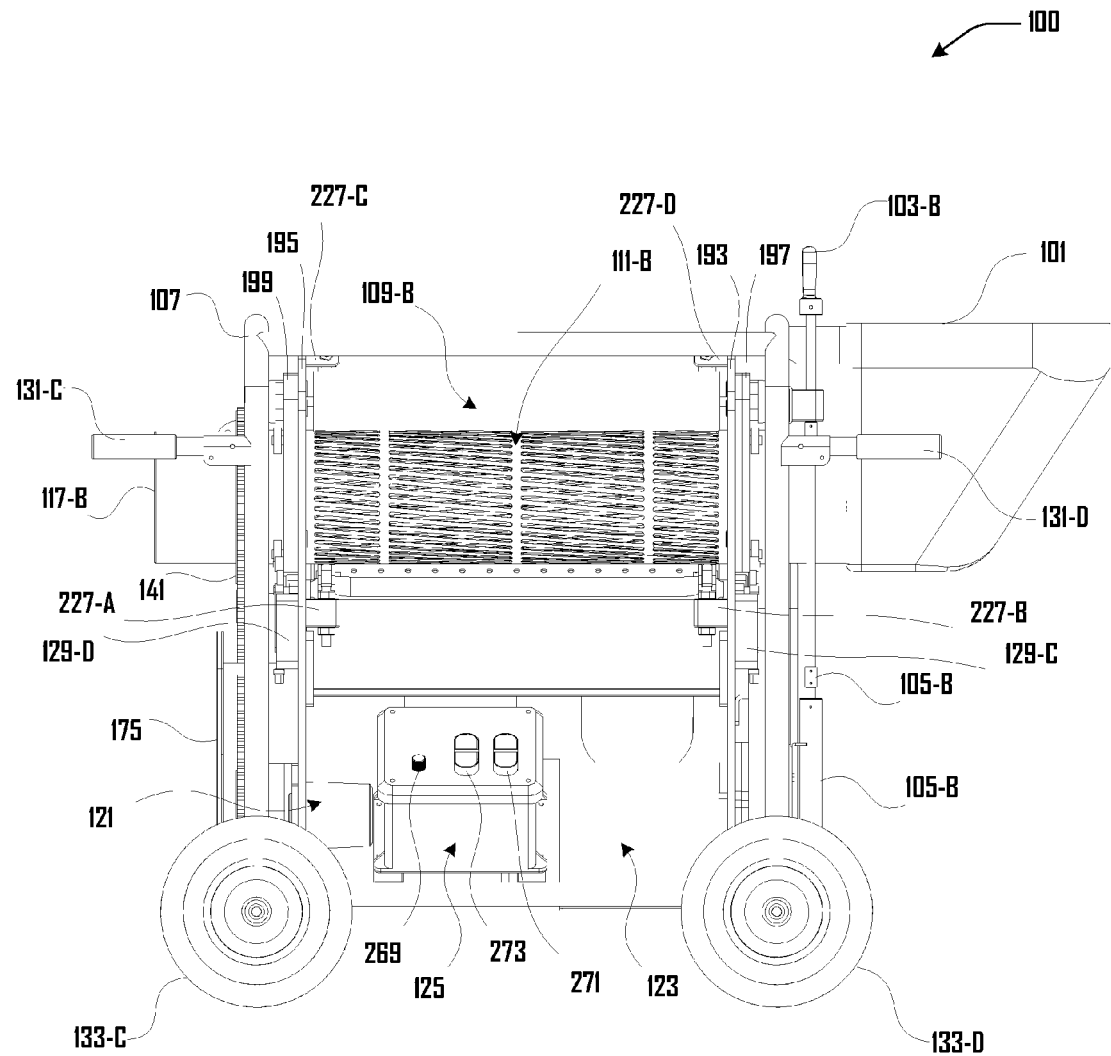
FIG. 2 is a left elevation view of an embodiment.
Figure 3:
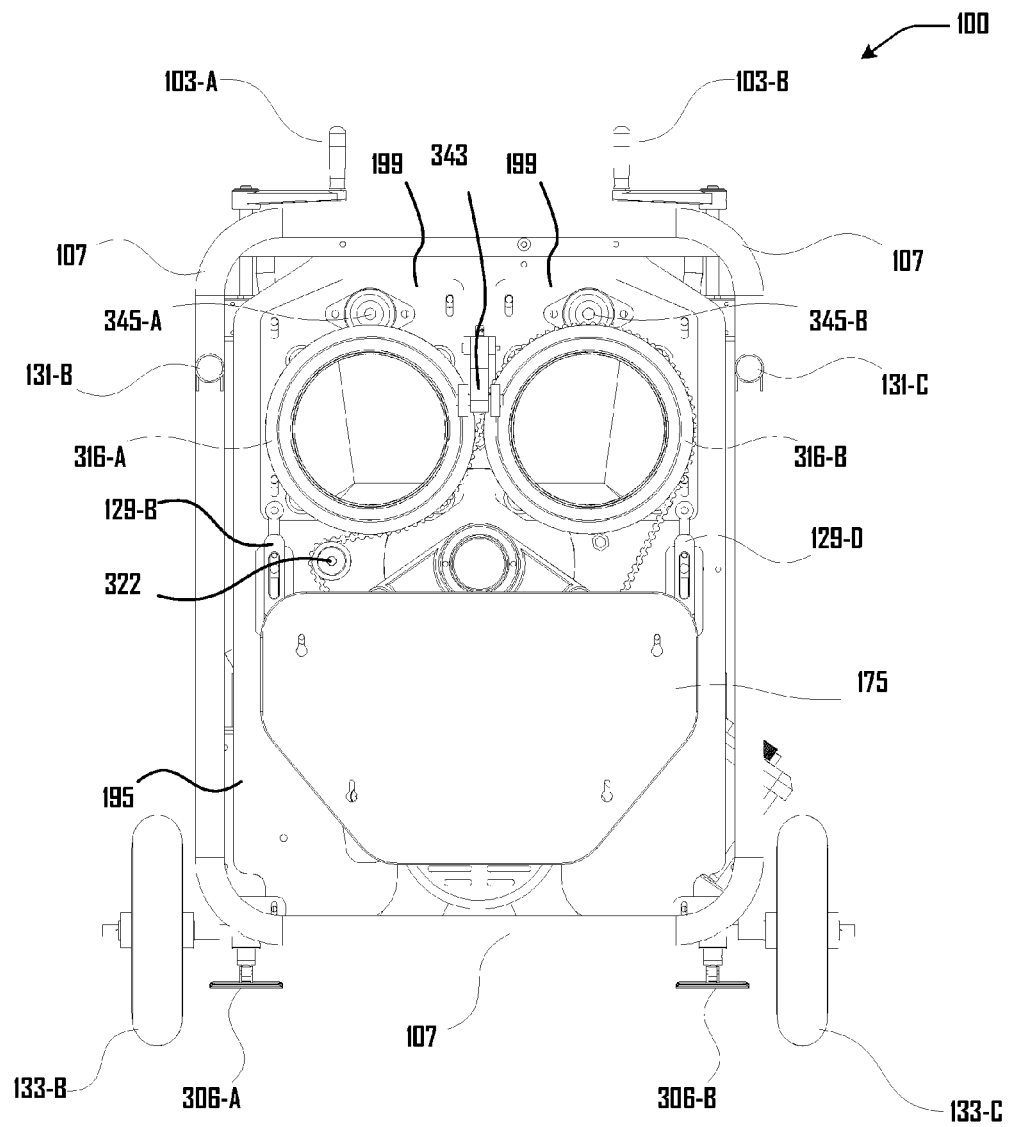
FIG. 3 is a back elevation view of an embodiment.

FIG. 1 is a right elevation view of an embodiment. FIG. 2 is a left elevation view of the embodiment illustrated in FIG. 1. FIG. 3 is a back elevation view of the embodiment illustrated in FIG. 1.

Figure 4:
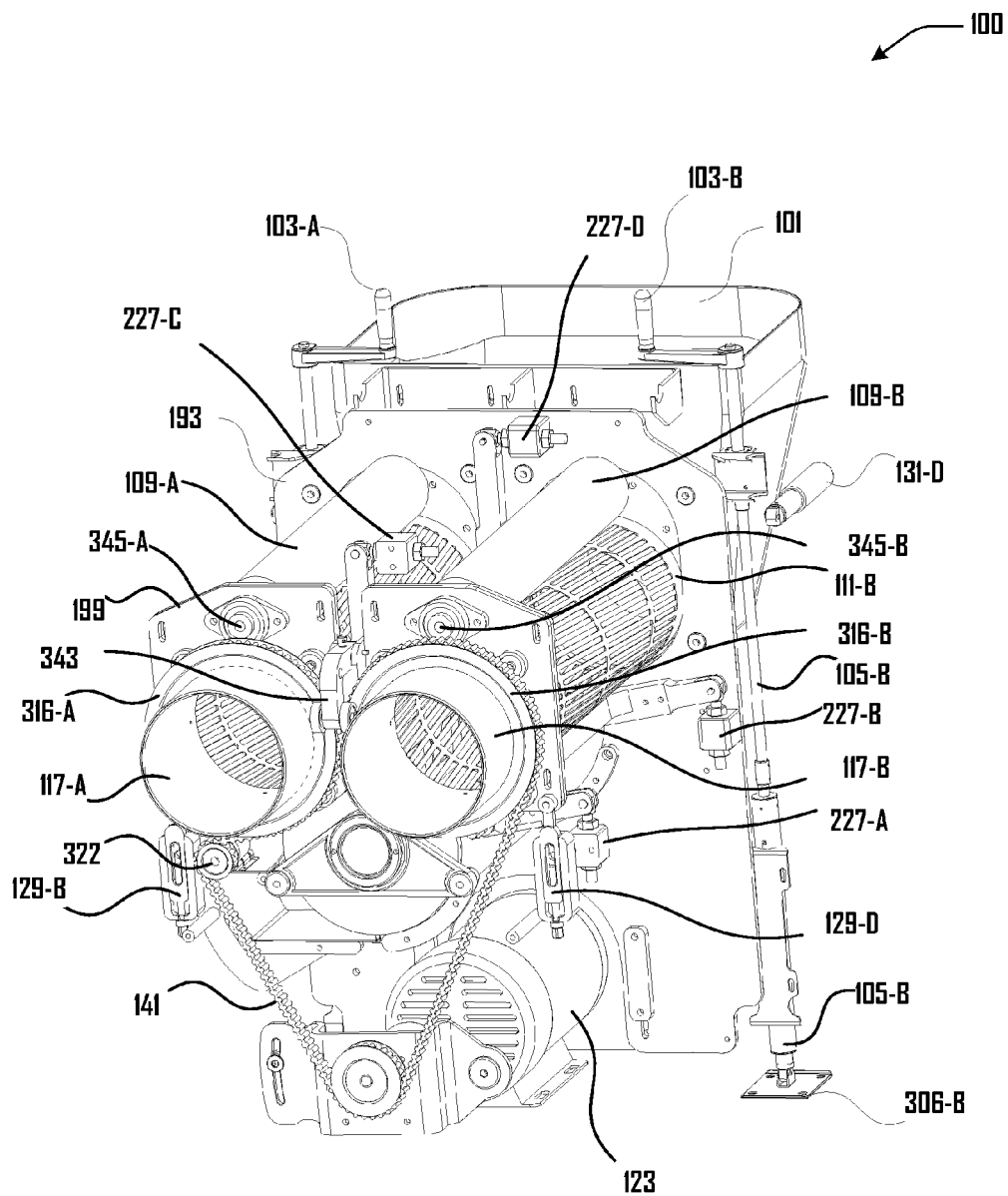
FIG. 4 is an isometric back-left-top view of an embodiment.

FIG. 4 is an isometric back-left-top view of the embodiment illustrated in FIG. 1, with certain components hidden to allow a better view of the shown components.

FIG. 5A is a back elevation view of the embodiment illustrated in FIG. 1, with certain components hidden to allow a better view of the shown components. FIG. 5B is an isometric back-right-top view of the embodiment illustrated in FIG. 1, with the same components hidden as in FIG. 5A.

FIG. 6A is a back-left-top isometric view of the embodiment illustrated in FIG. 1, with all components hidden except for the Barrel Blades 549, Blade Edges 657, Blade Adjustment Axles 555, Blade Adjustment Assemblies 227, and Reel Axle 646.

FIG. 6B is a back elevation view of the components shown in FIG. 6A, as well as Horizontal Plane 675, on which both Blade Edges 657 reside and dotted lines at element 676 (discussed above).

Figure 7:
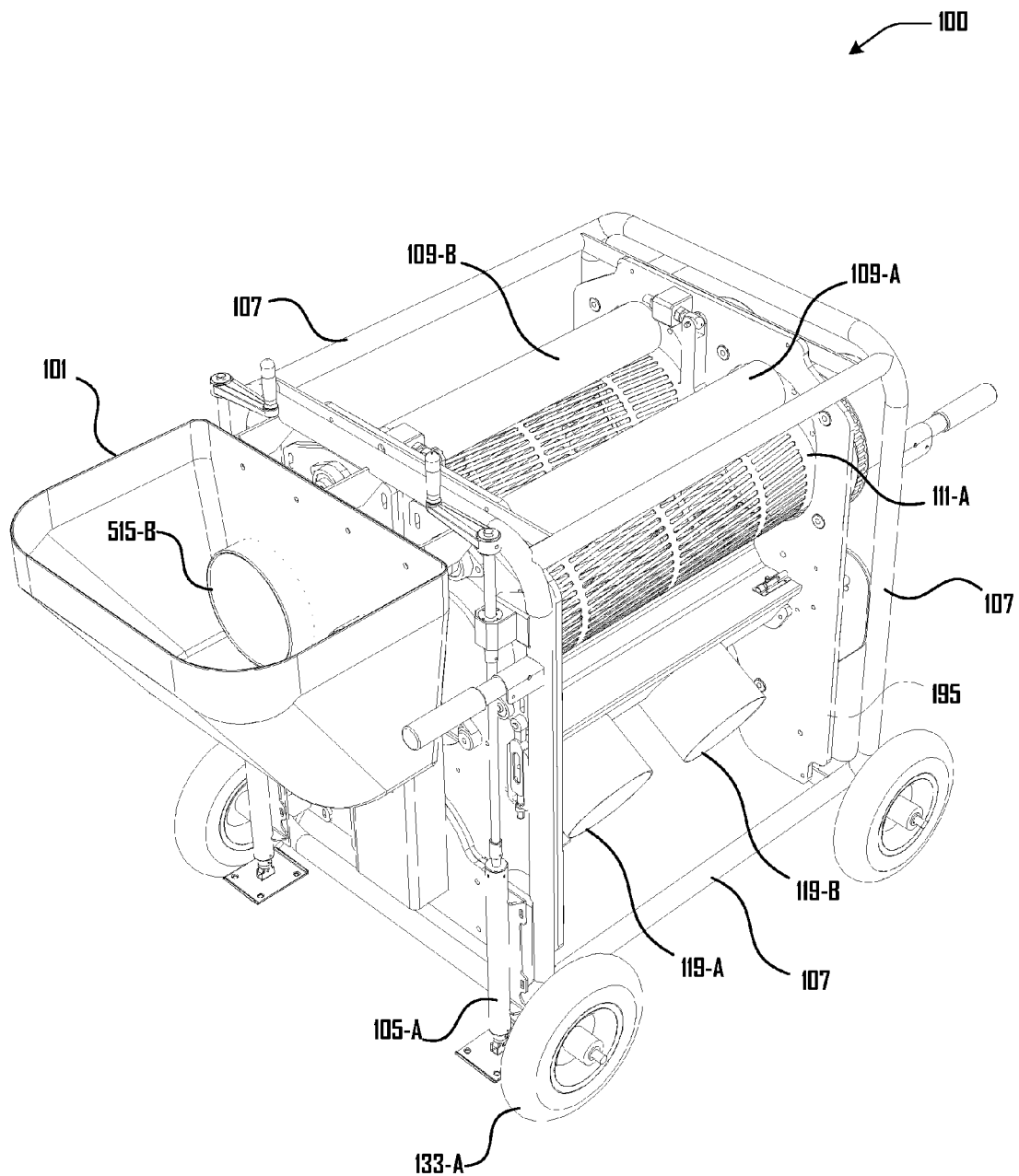
FIG. 7 is a front-right-top isometric view of an embodiment.

FIG. 7 is a front-right-top isometric view of the embodiment illustrated in FIG. 1.

Figure 8:
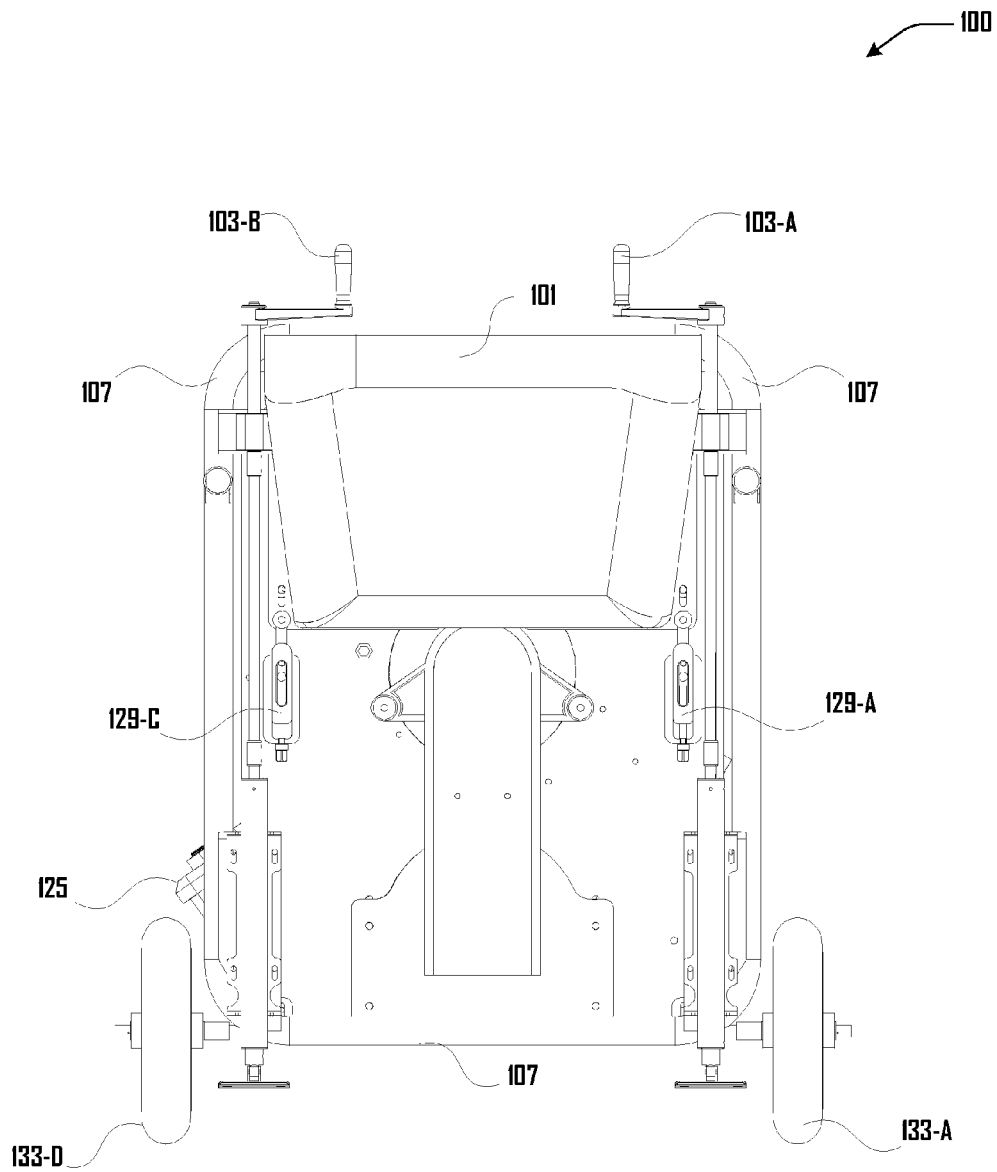
FIG. 8 is a front elevation view of an embodiment.

FIG. 8 is a front elevation view of the embodiment illustrated in FIG. 1.

Figure 9:
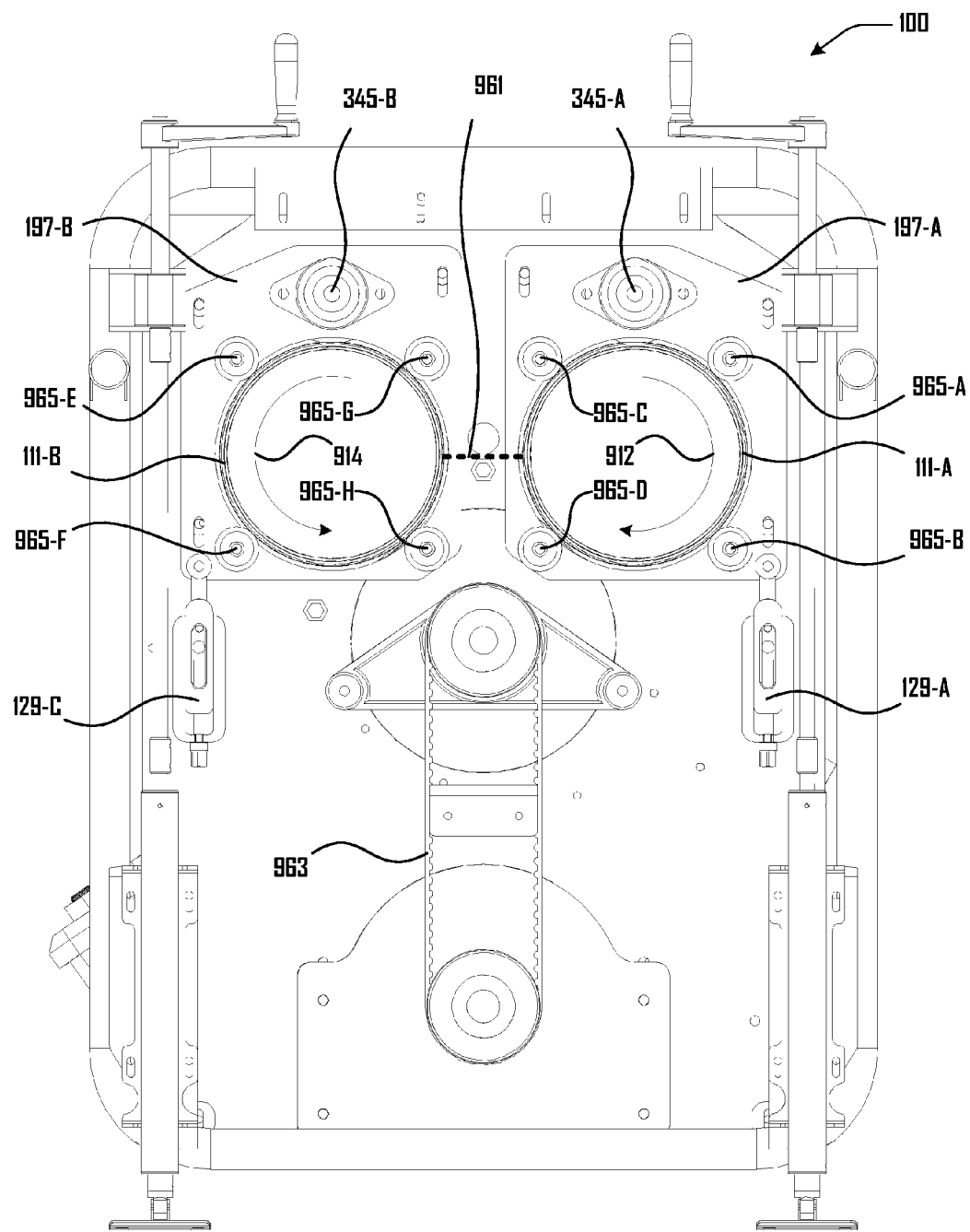
FIG. 9 is a front elevation view of an embodiment with components hidden.

FIG. 9 is a front elevation view of the embodiment illustrated in FIG. 1 with components hidden.

Figure 10:
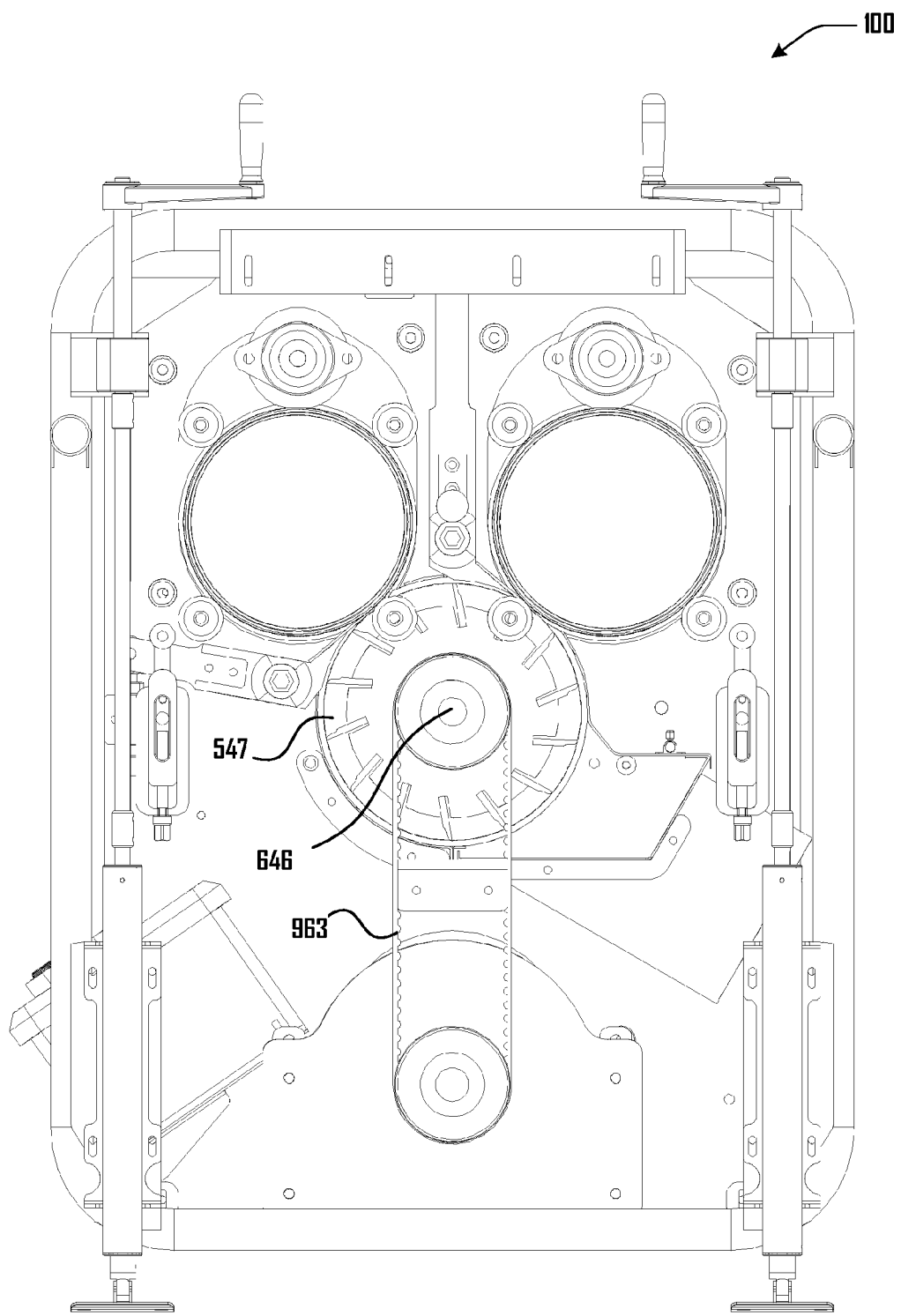
FIG. 10 is a front elevation view of an embodiment with more components hidden relative to FIG. 9.

FIG. 10 is a front elevation view of the embodiment illustrated in FIG. 1, with more components hidden relative to FIG. 9.

Figure 11:
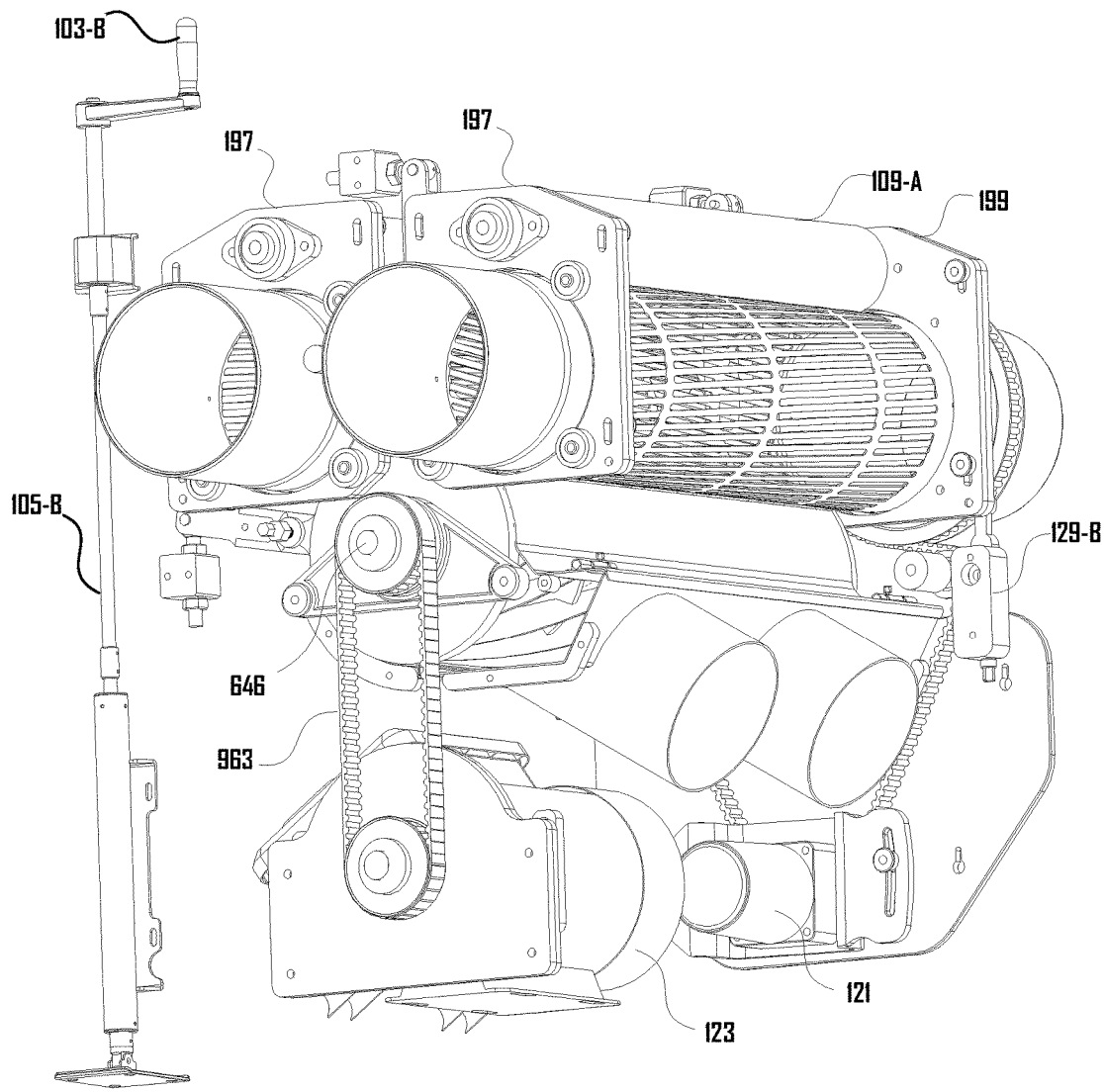
FIG. 11 is a front-right-bottom isometric view of an embodiment with more components hidden relative to FIG. 10.

FIG. 11 is a front-right-bottom isometric view of the embodiment illustrated in FIG. 1, with more components hidden relative to FIG. 10.

Figure 12A:
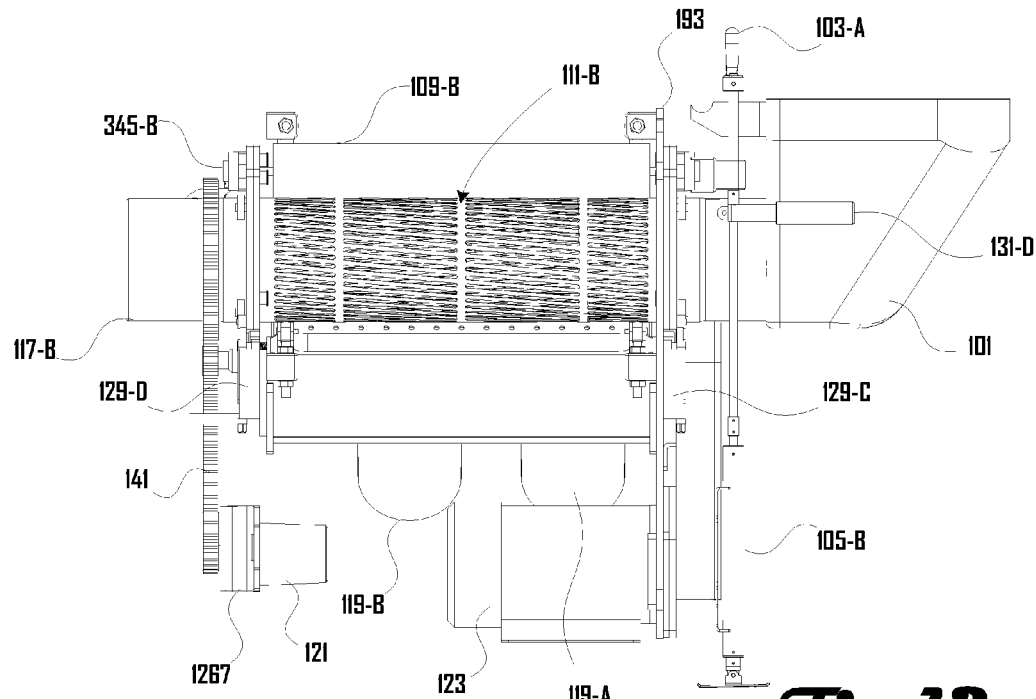
FIG. 12A is a left elevation view of an embodiment with the same components hidden as in FIG. 11.

FIG. 12A is a left elevation view of the embodiment illustrated in FIG. 1, with the same components hidden as in FIG. 11.

Figure 12B:
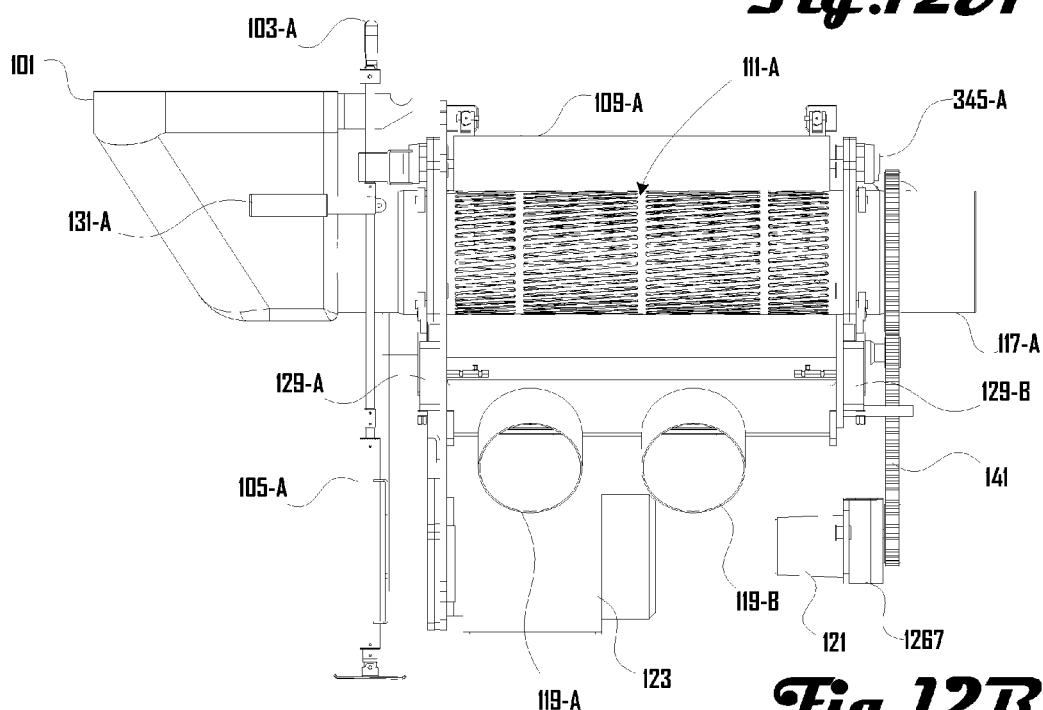
FIG. 12B is a right elevation view of an embodiment with the same components hidden as in FIG. 11.

FIG. 12B is a right elevation view of the embodiment illustrated in FIG. 1, with the same components hidden as in FIG. 11.

Figure 13:
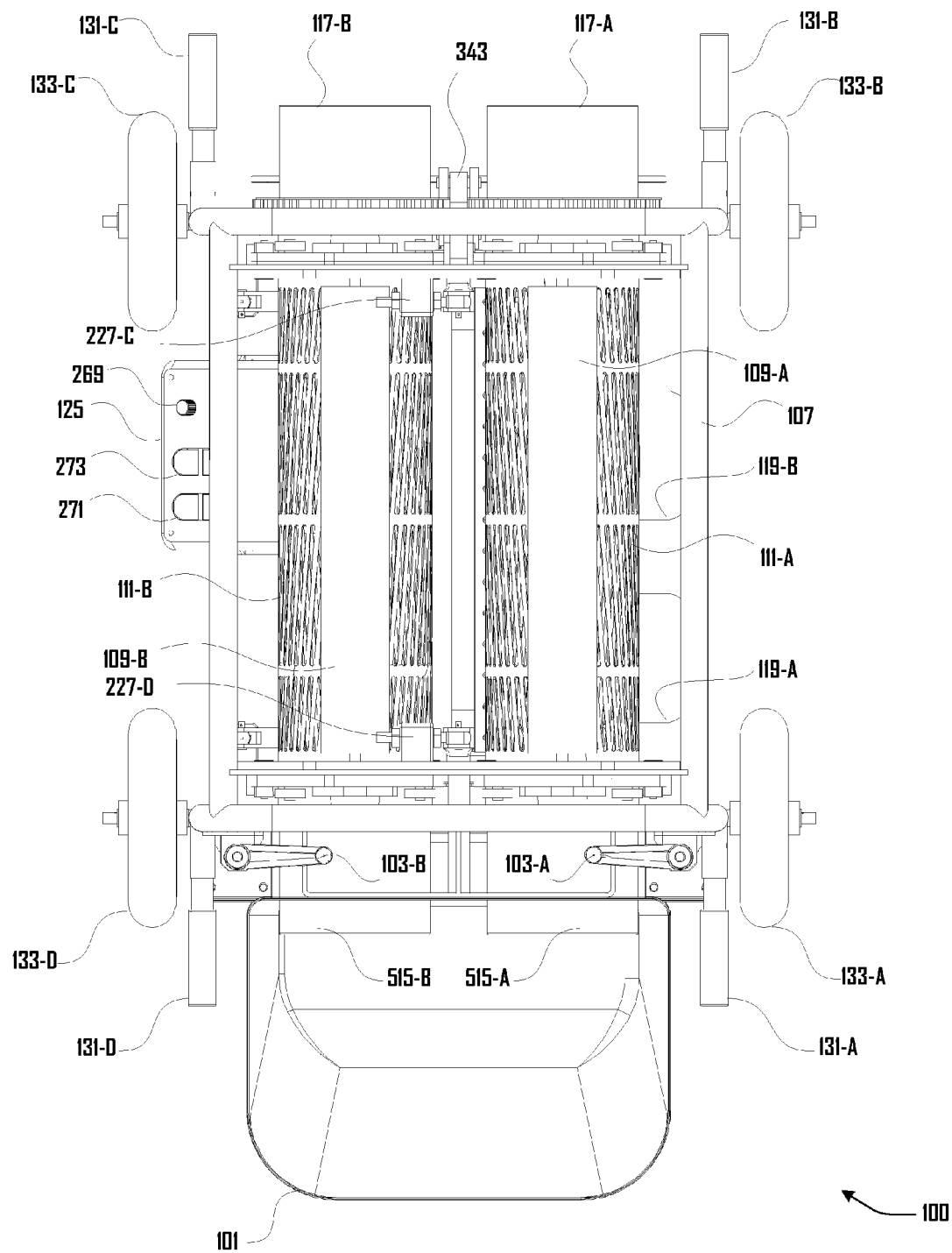
FIG. 13 is a top plan view, with the front of the trimmer at the bottom of the illustration.

FIG. 13 is a top plan view, with the front of the Trimmer 100 at the bottom of the illustration.

Figure 14A:
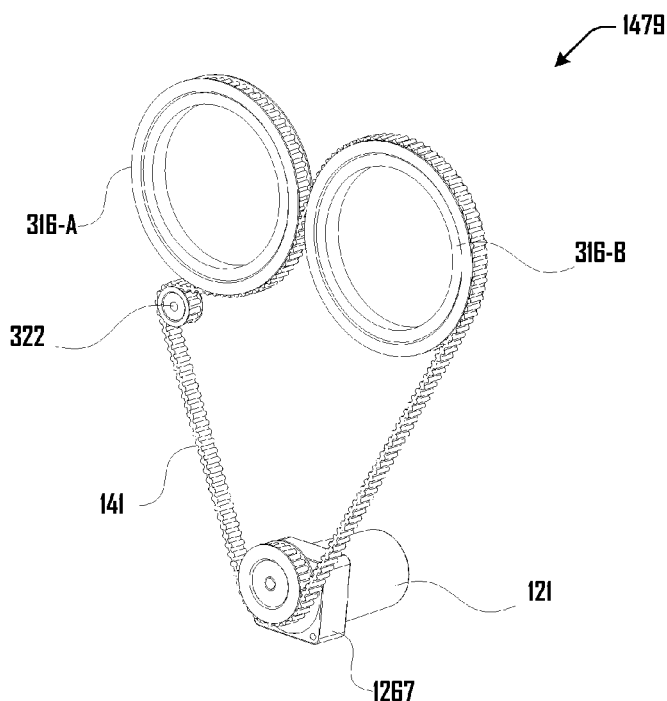
FIG. 14A is a back-left-top isometric view of a barrel power train.
Figure 14B:
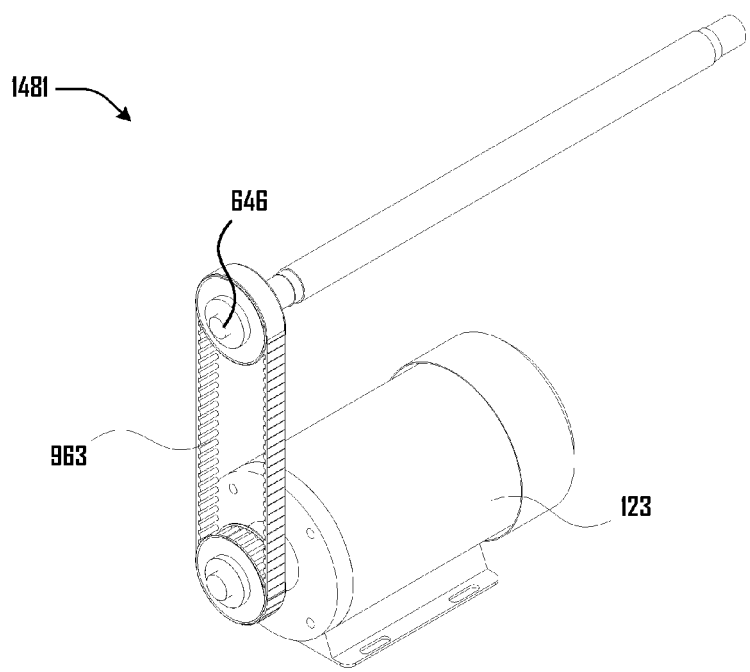
FIG. 14B is a front-right-top isometric view of a reel power train.

FIG. 14A is a back-left-top isometric view of a Barrel Power Train 1479, discussed above. FIG. 14B is a front-right-top isometric view of a Reel Power Train 1481.

FIG. 15A is a back-right-top isometric view of the embodiment illustrated in FIG. 1, further comprising the Rear Mounted Trimmer-Trimmer Support 1583 and related components (discussed above). FIG. 15B is a back-right-bottom isometric view of the embodiment illustrated in FIG. 15A.

FIG. 16A is a front-right-top isometric view of the embodiment illustrated in FIG. 1, further comprising the Front Mounted Trimmer-Trimmer Support 1683 and related components (discussed above). FIG. 16B is a front-right-top isometric detail view of the Front Mounted Trimmer-Trimmer Support illustrated in FIG. 16A.

Figure 17C:
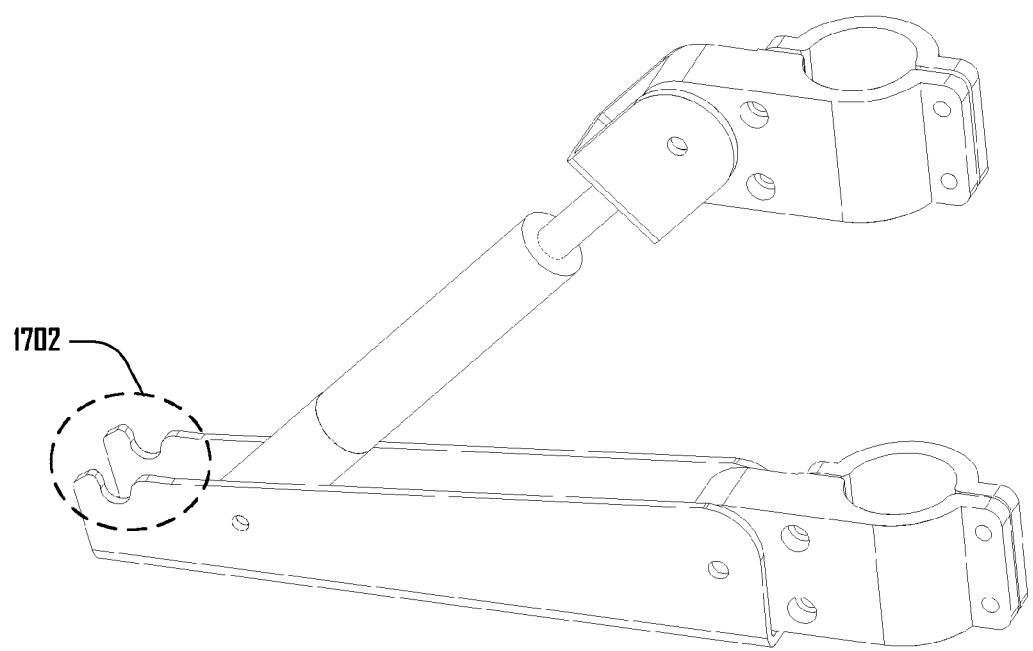
FIG. 17C is a back-right-top perspective view of a portion of the trimmer-trimmer support illustrated in FIG. 17A.

FIG. 17A is a right elevation view of an embodiment of Trimmer-Trimmer Support 1700. FIG. 17B is a rear-right-top isometric view of two of the Trimmer-Trimmer Supports 1700 illustrated in FIG. 17A. FIG. 17C is a rear-right-top isometric view of a portion of one of the Trimmer-Trimmer Supports 1700 illustrated in FIG. 17B.

FIG. 18 is a schematic diagram of electronics in a trimmer embodiment (discussed above).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect between two or more elements; the coupling of connection between the elements can be physical, logical, or a combination thereof. Additionally, the words, "herein," "above," "below," and words of similar import, when used in this application, shall refer to this application as a whole and not to particular portions of this application. When the context permits, words in the description using the singular may also include the plural while words using the plural may also include the singular. The word "or," in reference to a list of two or more items, covers all of the following interpretations of the word: any of the items in the list, all of the items in the list, and any combination of one or more of the items in the list.

The above detailed description of embodiments is not intended to be exhaustive or to limit the disclosure to the precise form disclosed above. While specific embodiments of and examples for the trimmer are described above for illustrative purposes, various equivalent modifications are possible within the scope of the system, as those skilled in the art will recognize.

The invention claimed is:

1. A plant trimmer comprising: a first barrel and a second barrel, wherein the first barrel and the second barrel each separately comprise: i) an inlet into which a plant material is fed, ii) a perforated barrel through which the plant material tumbles, wherein the perforated barrel comprises a set of perforations, wherein the set of perforations allow a plant projection to protrude through the perforated barrel and be trimmed off of the plant material, iii) a primary stream outlet through which the plant material exits the plant trimmer after being trimmed off of the plant material;

a set of mounting plates holding the first and second barrels parallel to one another on barrel bearing, wherein the barrel bearings allow the first and second barrels to rotate;

a barrel powertrain coupled to the first and second barrels, wherein the barrel powertrain only allows the first and second barrels to counter-rotate;

a barrel motor coupled to the barrel powertrain, wherein a rotational force from the barrel-motor on the barrel powertrain causes the first and second barrels to counter-rotate;

one cutting reel, parallel to the first and second barrels, wherein the one cutting real rotates and cuts the plant projection which protrudes through the perforated barrels.

2. The plant trimmer according to claim 1, further comprising a first blade oriented parallel to the first barrel and a second blade oriented parallel to the second barrel, wherein the first and second blades contact the cutting reel.

3. The plant trimmer according to claim 2, wherein the first and second blades are substantially straight.

4. The plant trimmer according to claim 2, further comprising a first set of blade-reel space adjustors, configured to adjust a relative distance between the cutting reel and at least one of the first and second blades.

5. The plant trimmer according to claim 1, wherein the one cutting reel comprises a set of helical reel blades radially arranged around a reel axis of rotation, wherein the reel axis of rotation is parallel to the first and second barrels.

6. The plant trimmer according to claim 1, further comprising a set of barrel-reel space adjustors, configured to adjust a relative distance between the cutting reel and at least one of the first and second barrels.

7. The plant trimmer according to claim 1, further comprising a reel motor.

8. The plant trimmer according to claim 7, further comprising an electronic circuit, wherein the electronic circuit provides variable speed control of the barrel motor.

9. The plant trimmer according to claim 1, wherein the barrel power train comprises: a belt comprising an interior perimeter and an exterior perimeter; a first belt engagement ring secured to the first barrel, wherein the first belt engagement ring engages with the belt; a second belt engagement ring secured to the second barrel, wherein the second belt engagement ring engages with the belt; a third belt engagement ring secured to the barrel motor, wherein the third belt engagement ring engages with the belt; a roller in contact with the belt; wherein the belt transfers kinetic energy from the barrel motor to the first and second barrels.

10. The plant trimmer according to claim 9, wherein the interior perimeter of the belt contacts an exterior of the first belt engagement ring and the exterior perimeter of the belt contacts an exterior of the second belt engagement ring along a path defined by perimeters of the first belt engagement ring, the second belt engagement ring, the third belt engagement ring, and the roller.

11. The plant trimmer according to claim 9, wherein the belt is one of a strap or a roller chain.

12. The plant trimmer according to claim 9, wherein the belt comprises symmetrical interior and exterior perimeters.

13. The plant trimmer according to claim 1, wherein centers of each of the first and second barrels are substantially aligned on a first horizontal plane and wherein the cutting reel is proximate to the first barrel along a first area and is proximate to the second barrel along a second area, wherein the first and second areas lie on a second horizontal plane, wherein the second horizontal plane is below the first horizontal plane and above a third horizontal plane defined by the-bottoms of the first and second barrels.

14. The plant trimmer according to claim 13, wherein counter-rotation of the first and second barrels causes the plant material in the barrels to accumulate along the first and second areas.

15. The plant trimmer according to claim 1, further comprising a jack, wherein the jack is configured to raise and lower the inlets of the plant trimmer.

16. The plant trimmer according to claim 15, wherein the jack is a screw jack.

17. The plant trimmer according to claim 15, wherein the plant trimmer is a first plant trimmer and further comprising a trimmer—trimmer support to secure the first plant trimmer to a second plant trimmer when inlets of the second plant trimmer abut primary stream outlets of the first plant trimmer.

18. The first and second plant trimmers according to claim 17, wherein the jack is a first jack and wherein the second plant trimmer comprises a second jack configured to raise and lower inlets of the second plant trimmer, wherein the trimmer-trimmer support comprises an arm with an adjustable length.

19. The plant trimmer according to claim 1, wherein the set of perforations in each perforated barrel define a rifling along a long axis of each perforated barrel, and wherein the rifling encourages the plant material to traverse the perforated barrels when the perforated barrels rotate.

\* \* \* \* \*